(12) United States Patent
Pajerski

(10) Patent No.: US 7,476,705 B2
(45) Date of Patent: Jan. 13, 2009

(54) AQUEOUS DISPERSIONS OF POLYURETHANE COMPOSITIONS

(75) Inventor: Anthony D. Pajerski, Broadview Heights, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 14 days.

(21) Appl. No.: 11/462,466

(22) Filed: Aug. 4, 2006

(65) Prior Publication Data

US 2006/0264568 A1 Nov. 23, 2006

Related U.S. Application Data

(63) Continuation-in-part of application No. PCT/US2006/004148, filed on Feb. 7, 2006.

(60) Provisional application No. 60/820,835, filed on Jul. 31, 2006, provisional application No. 60/650,500, filed on Feb. 7, 2005.

(51) Int. Cl.
*C08G 18/08* (2006.01)
*C08F 283/04* (2006.01)

(52) U.S. Cl. .................. 524/591; 524/589; 525/453

(58) Field of Classification Search ............... 524/589, 524/591; 525/453
See application file for complete search history.

(56) References Cited

U.S. PATENT DOCUMENTS

| | | | |
|---|---|---|---|
| 4,598,121 A | | 7/1986 | Disteldorf et al. |
| 4,983,662 A | | 1/1991 | Overbeek et al. |
| 5,070,136 A | | 12/1991 | Dersch et al. |
| 5,147,926 A | * | 9/1992 | Meichsner et al. .......... 524/591 |
| 5,571,861 A | | 11/1996 | Klein et al. |
| 5,623,016 A | | 4/1997 | Klein et al. |
| 6,063,861 A | | 5/2000 | Irle et al. |
| 6,462,127 B1 | * | 10/2002 | Ingrisch et al. ............. 524/589 |
| 6,576,702 B2 | | 6/2003 | Anderle et al. |
| 2002/0028875 A1 | * | 3/2002 | Anderle et al. ............. 524/591 |
| 2005/0171315 A1 | * | 8/2005 | Wakabayashi et al. ........ 528/26 |
| 2006/0089453 A1 | * | 4/2006 | Pajerski ..................... 524/589 |

* cited by examiner

*Primary Examiner*—Mark Eashoo
*Assistant Examiner*—Noah Frank
(74) *Attorney, Agent, or Firm*—Samuel B. Laferty; Joe A. Powell; Thoburn T. Dunlap

(57) ABSTRACT

An aqueous dispersion of polyurethane composites is made by forming a mixture of urethane prepolymer or polymer, ketone functional molecule/oligomers, and hydrazine functional molecule/oligomers; and dispersing the mixture so made in aqueous medium.

25 Claims, No Drawings

AQUEOUS DISPERSIONS OF POLYURETHANE COMPOSITIONS

CROSS-REFERENCE

This application claims priority from PCT/US2006/004148 filed Feb. 7, 2006, which claimed priority from Provisional Application Ser. No. 60/650,500 filed on Feb. 7, 2005. This application claims priority from Provisional Application Ser. No. 60/820,835 filed on Jul. 31, 2006.

FIELD OF THE INVENTION

This invention relates to aqueous dispersions of polyurethane including co-reactive molecules/oligomers of a) a ketone functional moiety and b) a hydrazine functional moiety useful in a variety of applications including coatings such as wood floor coatings. Co-reactive components would offer the benefit of high performance at low or reduced volatile organic component emission.

BACKGROUND OF THE INVENTION

U.S. Pat. No. 4,598,121 disclosed a method for preparing an aqueous polyurethane dispersion, comprising (a) preparing a prepolymer with free NCO groups by reacting an aliphatic or cycloaliphatic polyisocyanate with a polyol, and an anionic compound; (b) dispersing said prepolymer in water; (c) reacting said water-dispersed prepolymer with a diamino hydrazide as a chain lengthening agent; and (d) reacting the prepolymer of step (c) in said dispersion with formaldehyde to affect crosslinking.

U.S. Pat. No. 4,983,662 disclosed an aqueous self crosslinkable coating composition comprising an aqueous dispersion of at least one polyurethane and having hydrazine (or hydrazone) functional groups and carbonyl functional groups disposed therein to provide a self crosslinking reaction, in which the polyurethane polymer takes part, via azomethine formation during and/or after film formation.

U.S. Pat. No. 5,070,136 disclosed an aqueous polymer dispersions essentially containing a copolymer of a) from 85 to 98.5% by weight of methacrylates, b) from 0.5 to 4% by weight of acrylic acid and/or methacrylic acid, c) from 0.5 to 4% by weight of acrylamide and/or methacrylamide, d) from 0.5 to 4% by weight of an $\alpha,\beta$-ethylenically di-unsaturated or polyunsaturated compound and e) from 0 to 3% by weight of a carbonyl-containing $\alpha,\beta$-ethylenically unsaturated compound, a process for their preparation, and their use for coating wood.

U.S. Pat. Nos. 5,571,861 and 5,623,016 disclosed an aqueous, auto crosslinking polymer dispersion binder(s) comprising polyhydrazides and carbonyl-containing polyurethane-vinyl hybrid polymers and also, if desired, conventional additives are useful in base coatings, aqueous coatings, adhesives and printing inks.

U.S. Pat. No. 6,063,861 disclosed a storage stable, aqueous polyurethane-polyacrylate hybrid dispersions, which are self crosslinkable at room temperature and contain A) 10 to 95 wt. %, of a polyurethane dispersion, B) 5 to 90 wt. %, of a polymer prepared in the presence of component A) from a mixture of vinyl monomers containing 0.5 to 20 wt. %, based on the total resin solids content of the hybrid dispersion, of a vinyl monomer containing acetoacetoxy groups and C) an at least difunctional primary or secondary amine, which is present in an equivalent ratio of amino groups to acetoacetoxy groups of 0.5:1 to 1.1:1, in which the wt. % of components A) and B) add up to 100, based on the total weight of components A) and B). The invention also relates to one-component coating compositions containing these hybrid dispersions as binders and to substrates coated with these coating compositions.

U.S. Pat. No. 6,576,702 disclosed waterborne polyurethane dispersions are prepared by reacting (1) at least one polyisocyanate; (2) at least one active hydrogen containing compound, such as a polyol or a polyamide; and (3) preferably also at least one water-dispersibility enhancing compound having water-dispersion enhancing groups, in order to form an isocyanate terminated prepolymer. The prepolymer subsequently is (1) optionally neutralized by reaction with at least one neutralizing agent, (2) dispersed in water, and then (3) chain extended by reaction with at least one of water, inorganic or organic polyamine having an average of about 2 or more primary and/or secondary amine groups, or combinations thereof. At least one plasticizer is introduced into the reaction mixture at any time during prepolymer formation or before the prepolymer is dispersed in water. The plasticizer substantially or completely replaces other organic diluents or solvents. Various types of plasticizers may be employed, including reactive plasticizers.

SUMMARY OF THE INVENTION

Aqueous dispersions of polyurethane, including a) ketone functional molecule/oligomers and a co-reactive b) hydrazine functional moiety (e.g., hydrazide, hydrazone, ketoxime) are described. The polyurethane can be made by any conventional formation process that can also include the addition of the ketone functional moiety and hydrazine functional moiety already discussed. The ketone functional moiety and hydrazine functional moiety can promote inter particle penetration and coalescence during particle coagulation of the polyurethane dispersion during film formation. If a film or polymer layer is desired in the final application, good coalescence promotes optimal physical property of strength, film integrity, etc. Desirably, the reaction between the ketone functional moiety and hydrazine functional moiety is delayed until after particle coagulation and coalescence, but the technology is not limited thereby. In one embodiment, the ketone functional moiety and the hydrazine functional moiety react to form azomethine linkages as taught in U.S. Pat. No. 4,983,662. Desirably, this reaction between the ketone groups of the ketone functional moiety and the hydrazide groups of the functional moiety proceeds at a reasonable rate at 20-25° C. such that lower molecular weight species associated with these moieties are converted at 20-25° C. to higher molecular weight and/or possibly crosslinked species that aid rather than detract from polymer hardness, strength, solvent resistance, and related properties of wear resistance.

The ketone functional moieties and hydrazine functional moieties of this disclosure do not need to be attached to polymer chains and do not need to react to crosslink polymer chains (as disclosed in the prior art) in order to improve the properties of a polyurethane composition. While not wishing to be bound by theory, it appears as if the reaction products of the ketone functional moieties and hydrazine functional moieties can contribute enough entanglements of high molecular weight polyurethane to the composition after film formation to give the final film more desirable properties such as harder, more scratch resistant, more scuff resistance, better chemical resistance, etc. Lower molecular weight ketone containing species and lower molecular weight hydrazine moiety containing species can also lower the composite Tg during coalescing stage so that films with better cohesion or requiring less coalescing aid are possible. While the ketone and/or hydrazine functional moieties do not need to be attached to polymer chains, the inclusion of polymer attached reactive moieties (either ketone and/or hydrazine) in combination with lower molecular weight functional moiety containing species is anticipated by this disclosure.

A particular chain pendant ketone functional group beyond that disclosed in U.S. Pat. No. 4,983,662 is disclosed that avoids having pH shifting basic nitrogen groups near the active carbonyl ketone group. In U.S. Pat. No. 4,982,662, Examples 2, 4, 8, 9, and 10, the authors used a reaction product of diethanolamine and diacetoneacrylamide that resulted in a basic nitrogen (nitrogen only attached to adjacent atoms selected from carbon and hydrogen and not attached to a carbonyl group) being within 6 atoms of the ketone carbonyl group. As the ketone hydrazide reaction is pH sensitive (hindered by pH above 7 and accelerated below pH 7), it is desirable to identify and use chain pendant (laterally attached) carbonyl groups that a) do not have basic nitrogen in the molecule, b) at least have the basic nitrogen separated by more than 7 atoms from the active carbonyl, c) possibly exclude basic nitrogen atoms in the molecule if non-polymeric, or d) exclude basic nitrogen atoms in the lateral side chain if polymeric. The term chain pendant is used as the reference did use dihydroxyacetone in Example 1 (which did not have basic nitrogen nearby). Note that for the purposes of this application, nitrogen atoms attached to carbonyl groups are not considered to be undesirable basic nitrogen atoms as they have less influence on pH than the nitrogen of diethanolamine, which is easily protonated. The Example 2 using dihydroxyacetone resulted in the carbon of the carbonyl group being part of the urethane polymer backbone (where it had less mobility to relocate to react with a hydrazine moiety). A chain pendant ketone functionality for the purpose of this application will be defined as a ketone functional group attached as a non-polymeric molecule or as lateral segment to a polymer backbone and where the reactive ketone group is between 1 to 5 or 10 atoms from the end of the polymer/molecule rather than being in the polymer backbone or very near to the polymer backbone. Ketone groups so positioned have more mobility to position themselves sterically to react with hydrazine moieties.

Isocyanates are reacted with active hydrogen containing compounds such as polyols to form urethane prepolymers. The prepolymers are further reacted to eventually form polyurethane(urethane polymers). This prepolymer is in one embodiment neutralized by reaction with at least one neutralizing agent, dispersed in aqueous medium, and optionally chain extended by reaction with at least one of water, inorganic or organic polyamine having an average of about 2 or more primary and/or secondary amine groups, or combinations thereof. The ketone functional moieties are introduced into the reaction mixture at any time during prepolymer or polyurethane formation when they can be uniformly dispersed, in one embodiment this is before the prepolymer is dispersed in water. The hydrazine functional moieties are typically added after dispersion and/or chain extension, though they could be added earlier with chain extender or co-extender.

DETAILED DESCRIPTION OF THE INVENTION

In accordance with the invention, the polyurethane or its prepolymer, the ketone functional moiety and the hydrazine functional moiety dispersed in an aqueous medium to form a dispersion of composite particles composed of the polyurethane or its prepolymer, the ketone functional moiety, and the hydrazine functional moiety. The order of addition of these components to the final composition varies depending on when it is easiest to add each component and when addition can be achieved without undesirable side reactions.

DEFINITIONS

In this document, "polyurethane" is a generic term used to describe polymers including oligomers (e.g., prepolymers) which contain the urethane group, i.e., —O—C(=O)—NH—, regardless of how they are made. As well known, these polyurethanes can contain additional groups such as urea, allophanate, biuret, carbodiimide, oxazolidinyl, isocynaurate, uretdione, ether, ester, carbonate, etc., in addition to urethane groups. Typically, these will be above 2,000 Daltons in number average molecular weight and if chain extended during the processing can reach number average molecular weights in the millions of Daltons.

"Wt.%" means the number of parts by weight of monomer per 100 parts by weight of polymer, or the number of parts by weight of ingredient per 100 parts by weight of composition or material of which the ingredient forms a part.

"Aqueous medium" means a composition containing a substantial amount of water. It may contain other ingredients as well.

The "final polyurethane product" refers to the form of the polyurethane in the aqueous dispersion product of this invention. Where the polyurethane prepolymer is optionally chain extended, the final polyurethane product is this chain extended polymer. Where the polyurethane prepolymer is not chain extended, the final polyurethane product is the prepolymer itself.

"Substantial absence of surfactant" as well as "substantially free of residual surfactant" in reference to a dispersion means that the dispersion is made without intentionally including a surfactant (a possibility in some embodiments but not required in all embodiments) for suspending or dispersing the dispersed phase of the dispersion. Surfactant in this context refers to molecules whose primary function is to stabilize particles or go to interfaces between phases and modify the interfacial tension at those interfaces. The term surfactant does not include water dispersibility enhancing compounds that are chemically reacted into a polyurethane or urethane prepolymer.

A preferred ketone functional moiety in one embodiment refers to a low molecular weight mono of poly ketone or mono or poly aldehyde (excluding formaldehyde) reactant generally below 2000 Dalton number average molecular weight. For the purposes of this application when referring to number average molecular weight below 2000 Daltons, it will be acceptable to substitute weight average for number average as these two vary very little when dealing with such low molecular weights. These can be formed by any reaction mechanism as discussed later. The ketone or aldehyde functional groups are generally not blocked (e.g., temporarily reacted with a removable chemical moiety to avoid premature reaction), although in some embodiments it might be desirable to block some ketone or aldehyde functional groups for specific requirements.

In one embodiment, the preferred ketone functionalized molecule is a ketone functionalized epoxidized triglyceride, other ketone functionalized polyester type molecule, and/or ketone functionalized alcohol, optionally coupled.

A preferred hydrazine functional moiety in one embodiment refers to a low molecular weight molecule or oligomers having one or more hydrazine, hydrazide, or hydrazone groups. By a hydrazine functional group is meant the functional group of formula —NHNH$_2$. A hydrazone functional group is a group derived from such a hydrazine group by reaction with a monoketone or monaldehyde containing at least 2 carbon atoms. A typical hydrazide group might be formed by reacting a mono or polycarboxylic acid with hydrazine, or by reaction between an —NCO and hydrazine. Synthesis of hydrazine functional moiety(ies) will be discussed later.

POLYURETHAN PREPOLYMER INGREDIENTS

The polyurethane prepolymers of this invention are formed from at least one polyisocyanate, at least one active hydrogen-containing compound and, optionally, at least one water-dispersibility enhancing compound.

(i) Polyisocyanate

Suitable polyisocyanates have an average of about two or more isocyanate groups, preferably an average of about two to about four isocyanate groups per molecule and comprising about 5 to 20 carbon atoms (in addition to nitrogen, oxygen, and hydrogen) and include aliphatic, cycloaliphatic, araliphatic, and aromatic polyisocyanates, as well as products of their oligomerization, used alone or in mixtures of two or more. Diisocyanates are more preferred.

Specific examples of suitable aliphatic polyisocyanates include alpha, omega-alkylene diisocyanates having from 5 to 20 carbon atoms, such as hexamethylene-1,6-diisocyanate, 1,1 2-dodecane diisocyanate, 2,2,4-trimethyl-hexamethylene diisocyanate, 2,4,4-trimethyl-hexamethylene diisocyanate, 2-methyl-1,5-pentamethylene diisocyanate, and the like. Polyisocyanates having fewer than 5 carbon atoms can be used but are less preferred because of their high volatility and toxicity. Preferred aliphatic polyisocyaniates include hexamethylene-1,6-diisocyanate, 2,2,4-trimethyl-hexamethylene-diisocyanate, and 2,4,4-trimethyl-hexamethylene diisocyanate.

Specific examples of suitable cycloaliphatic polyisocyanates include dicyclohexylmethane diisocyanate, (commercially available as Desmodur™ W from Bayer Corporation), isophorone diisocyanate, 1,4-cyclohexane diisocyanate, 1,3-bis-(isocyanatomethyl)cyclohexane, and the like. Preferred cycloaliphatic polyisocyanates include dicyclohexylmethane diisocyanate and isophorone diisocyanate.

Specific examples of suitable araliphatic polyisocyanates include m-tetramethyl xylylene diisocyanate, p-tetramethyl xylylene diisocyanate, 1,4-xylylene diisocyanate, 1,3-xylylene diisocyanate, and the like. A preferred araliphatic polyisocyanate is tetramethyl xylylene diisocyanate.

Examples of suitable aromatic polyisocyanates include 4,4'-diphenylmethylene diisocyanate, toluene diisocyanate, their isomers, naphthalene diisocyanate, their oligomeric forms and the like. A preferred aromatic polyisocyanate is toluene diisocyanate.

(ii) Active Hydrogen-Containing Compounds

Any compound that provides a source of active hydrogen for reacting with isocyanate groups via the following reaction: —NCO+H—X→—NH—C(=O)—X, can be used as the active hydrogen-containing compound in this invention. Examples include but are not limited to polyols, polythiols and polyamines.

"Polyol" in this context means any product having an average of about two or more hydroxyl groups per molecule. Examples include low molecular weight products called "extenders" with number average molecular weight less than about 500 Dalton such as aliphatic, cycloaliphatic and aromatic polyols, especially diols, having 2-20 carbon atoms, more typically 2-10 carbon atoms, as well as "macroglycols," i.e., polymeric polyols having molecular weights of at least 500 Daltons, more typically about 1,000-10,000 Daltons, or even 1,000-6,000 Daltons. Examples of such macroglycols include polyester polyols including alkyds, polyether polyols, polycarbonate polyols, polyhydroxy polyester amides, hydroxyl-containing polycaprolactones, hydroxyl-containing acrylic polymers, hydroxyl-containing epoxides, polyhydroxy polycarbonates, polyhydroxy polyacetals, polyhydroxy polythioethers, polysiloxane polyols, ethoxylated polysiloxane polyols, polybutadiene polyols and hydrogenated polybutadiene polyols, polyisobutylene polyols, polyacrylate polyols, halogenated polyesters and polyethers, and the like, and mixtures thereof. The polyester polyols, polyether polyols, polycarbonate polyols, polysiloxame polyols, and ethoxylated polysiloxane polyols are preferred.

The polyester polyols typically are esterification products prepared by the reaction of organic polycarboxylic acids or their anhydrides with a stoichiometric excess of a diol or diols. Examples of suitable polyols for use in the reaction include poly(glycol adipate)s, poly(ethylene terephthalate) polyols, polycaprolactone polyols, alkyd polyols, orthophthalic polyols, sulfonated and phosphonated polyols, and the like, and mixtures thereof.

The diols used in making the polyester polyols include alkylene glycols, e.g., ethylene glycol, 1,2- and 1,3-propylene glycols, 1,2-, 1,3-, 1,4-, and 2,3-butylene glycols, hexane diols, neopentyl glycol, 1,6-hexanediol, 1,8-octanediol, and other glycols such as bisphenol-A, cyclohexane diol, cyclohexane dimethanol (1,4-bis-hydroxymethylcycohexane), 2-methyl-1,3-propanediol, 2,2,4-trimethyl-1,3-pentanediol, diethylene glycol, triethylene glycol, tetraethylene glycol, polyethylene glycol, dipropylene glycol, polypropylene glycol, dibutylene glycol, polybutylene glycol, dimerate diol, hydroxylated bisphenols, polyether glycols, halogenated diols, and the like, and mixtures thereof. Preferred diols include ethylene glycol, diethylene glycol, butylene glycol, hexane diol, and neopentyl glycol.

Suitable carboxylic acids used in making the polyester polyols include dicarboxylic acids and tricarboxylic acids and anhydrides, e.g., maleic acid, maleic anhydride, succinic acid, glutaric acid, glutaric anhydride, adipic acid, suberic acid, pimelic acid, azelaic acid, sebacic acid, chlorendic acid, 1,2,4-butane-tricarboxylic acid, phthalic acid, the isomers of phthalic acid, phthalic anhydride, fumaric acid, dimeric fatty acids such as oleic acid, and the like, and mixtures thereof. Preferred polycarboxylic acids used in making the polyester polyols include aliphatic and/or aromatic dibasic acids.

Particularly interesting polyols are the polyester diols, i.e., any compound containing the —C(=O)—O— group. Examples include poly(butanediol adipate), caprolactones, acid-containing polyols, polyesters made from hexane diol, adipic acid and isophthalic acid such as hexane adipate isophthalate polyester, hexane diol neopentyl glycol adipic acid polyester diols, e.g., Piothane 67-3000 HAI, Piothane 67-500 HAI, Piothane 67-3000 HNA (Panolam Industries) and Piothane 67-1000 HNA; as well as propylene glycol maleic anhydride adipic acid polyester diols, e.g., Piothane 50-1000 PMA; and hexane diol neopentyl glycol fumaric acid polyester diols, e.g., Piothane 67-500 UNF. Other preferred polyester diols include Rucoflex™. S1015-35, S1040-35, and S-1040-110 (Bayer Corporation).

The polyether polyols that can be used as the active hydrogen-containing compound in accordance with the present invention contain the —C—O—C— group. They can be obtained in a known manner by the reaction of (A) the starting compounds that contain reactive hydrogen atoms, such as water or the diols set forth for preparing the polyester polyols, and (B) allcylene oxides, such as ethylene oxide, propylene oxide, butylene oxide, styrene oxide, tetrahydrofuran, epichlorohydrin, and the like, and mixtures thereof. Preferred polyethers include poly(propylene glycol), polytetrahydrofuran, and copolymers of poly(ethylene glycol) and poly(propylene glycol).

Polycarbonate polyols include those containing the —O—C(=O)—O— group. They can be obtained, for example, from the reaction of (A) diols such 1,3-propanediol, 1,4-butanediol, 1,6-hexanediol, diethylene glycol, triethylene glycol, tetraethylene glycol, and the like, and mixtures thereof with (B) diarylcarbonates such as diphenylcarbonate or phosgene. Aliphatic and cycloaliphatic polycarbonate polyols can also be used.

Useful polyhydroxy polyacetals include the compounds that can be prepared from the reaction of (A) aldehydes, such as formaldehyde and the like, and (B) glycols such as diethylene glycol, triethylene glycol, ethoxylated 4,4'-dihydroxydiphenyldimethylmethane, 1,6-hexanediol, and the like. Polyacetals can also be prepared by the polymerization of cyclic acetals.

Instead of or in addition to a polyol, other compounds may also be used to prepare the prepolymer. Examples include polyamines, polyester amides and polyamides, such as the predominantly linear condensates obtained from reaction of (A) polybasic saturated and unsaturated carboxylic acids or their anhydrides, and (B) polyvalent saturated or unsaturated aminoalcohols, diamines, polyamines, and the like, and mixtures thereof.

Diamines and polyamines are among the preferred compounds useful in preparing the aforesaid polyester amides and polyamides. Suitable diamines and polyamines include 1,2-diaminoethane, 1,6-diaminohexane, 2-methyl-1,5-pentanediamine, 2,2,4-trimethyl-1,6-hexanediamine, 1,12-diaminododecane, 2-aminoethanol, 2-[(2-aminoethyl)amino]-ethanol, piperazine, 2,5-dimethylpiperazine, 1-amino-3-aminomethyl-3,5,5-trimethyl-cyclohexane(isophorone diamine or IPDA), bis-(4-aminocyclohexyl)-methane, bis-(4-amino-3-methyl-cyclohexyl)-methane, 1,4-diaminocyclohexane, 1,2-propylenediatnine, hydrazine, urea, amino acid hydrazides, hydrazides of semicarbazidocarboxylic acids, bis-hydrazides and bis-semicarbazides, diethylene triamine, triethylene tetramine, tetraethylene pentamine, pentaethylene hexamine, N,N,N-tris-(2-aminoethyl)amine, N-(2-piperazinoethyl)-ethylene diamine, N,N'-bis-(2-aminoethyl)-piperazin-e, N,N,N'-tris-(2-aminoethyl) ethylene diamine, N-[N-(2-aminoethyl)-2-amino-ethyl]-N'-(2-aminoethyl)-piperazine, N-(2-aminoethyl)-N'-(2-piperazinoethy-1)-ethylene diamine, N,N-bis-(2-aminoethyl)-N-(2-piperazinoethyl)amine, N,N-bis-(2-piperazinoethyl)-amine, polyethylene imines, iminobispropylamine, guanidine, melamine, N-(2-aminoethyl)-1,3-propane diamine, 3,3'-diaminobenzidine, 2,4,6-triaminopyrimidine, polyoxypropylene amines, tetrapropylenepentamine, tripropylenetetramine, N,N-bis-(6-aminohexyl)amine, N,N'-bis-(3-aminopropyl)ethylene diamine, and 2,4-bis-(4'-aminobenzyl)-aniline, and the like, and mixtures thereof. Preferred diamines and polyamines include 1-amino-3-aminomethyl-3,5,5-tri-methyl-cyclohexane (isophorone diamine or IPDA), bis-(4-aminocyclohexyl)-m-ethane, bis-(4-amino-3-methylcyclohexyl)-methane, ethylene diamine, diethylene triamine, triethylene tetramine, tetraethylene pentamine, and pentaethylene hexamine, and the like, and mixtures thereof. Other suitable diamines and polyamines include Jeffamine™. D-2000 and D-4000, which are amine-terminated polypropylene glycols, differing only by molecular weight, and which are available from Huntsman Chemical Company.

Low molecular weight alkylene polyols (e.g., glycerol, trimethylol propane, etc.) can be used as urethane branching agents. Branching can provide beneficial properties to a urethane polymer and can provide additional functional (reactive) end groups (generally above 2 as one goes from a linear oligomers to a branched oligomers or polymer) for each urethane prepolymer or polymer.

(iii) Water-Dispersibility Enhancing Compounds

Polyurethanes are generally hydrophobic and not water-dispersible. In accordance with one embodiment of the invention, therefore, at least one water-dispersibility enhancing compound (i.e., monomer), which has at least one, hydrophilic (e.g., poly(ethylene oxide)), ionic or potentially ionic group is optionally included in the polyurethane prepolymer to assist dispersion of the polyurethane prepolymer as well as the chain-extended polyurethane made therefrom in water, thereby enhancing the stability of the dispersions so made. Typically, this is done by incorporating a compound bearing at least one hydrophilic group or a group that can be made hydrophilic (e.g., by chemical modifications such as neutralization) into the polymer chain. These compounds may be of a nonionic, anionic, cationic or zwitterionic nature or the combination thereof. For example, anionic groups such as carboxylic acid groups can be incorporated into the prepolymer in an inactive form and subsequently activated by a salt-forming compound, such as a tertiary amine defined more fully hereinafter, in order to create a prepolymer having an acid number from about 1 to about 60, typically 1 to about 40, or even 10 to 35 or 12 to 30 or 14 to 25. Other water-dispersibility enhancing compounds can also be reacted into the prepolymer backbone through urethane linkages or urea linkages, including lateral or terminal hydrophilic ethylene oxide or ureido units.

Water dispersibility enhancing compounds of particular interest are those which can incorporate carboxyl groups into the prepolymer. Normally, they are derived from hydroxy-carboxylic acids having the general formula $(HO)_xQ(COOH)_y$, wherein Q is a straight or branched hydrocarbon radical containing 1 to 12 carbon atoms, and x and y are 1 to 3. Examples of such hydroxy-carboxylic acids include dimethylolpropanoic acid (DMPA), dimethylol butanoic acid (DMBA), citric acid, tartaric acid, glycolic acid, lactic acid, malic acid, dihydroxymalic acid, dihydroxytartaric acid, and the like, and mixtures thereof. Dihydroxy-carboxylic acids are more preferred with dimethylolproanoic acid (DMPA) being most preferred.

Water dispersibility enhancing compounds may include reactive polymeric polyol components that contain pendant anionic groups which can be polymerized into the prepolymer backbone to impart water dispersible characteristics to the polyurethane subsequent to chain extension. The term anionic functional polymeric polyol includes anionic polyester polyols, anionic polyether polyols, and anionic polycarbonate polyols. These polyols include moieties that contain active hydrogen atoms. Such polyols containing anionic groups are described in U.S. Pat. No. 5,334,690.

Another group of water-dispersibility enhancing compounds of particular interest are side chain hydrophilic monomers. Some examples include alkylene oxide polymers and copolymers in which the alkylene oxide groups have from 2-10 carbon atoms as shown, for example, in U.S. Published Patent Application No. 2003195293, the disclosure of which is incorporated herein by reference.

Other suitable water-dispersibility enhancing compounds include thioglycolic acid, 2,6-dihydroxybenzoic acid, sulfoisophthalic acid (this component would preferably be incorporated as part of a polyester), polyethylene glycol, and the like, and mixtures thereof.

(iv) Compounds Having at Least One Crosslinkable Functional Group

Compounds having at least one crosslinkable functional group can also be incorporated into the polyurethane prepolymers of the present invention, if desired. Examples of such compounds include those having carboxylic, carbonyl, amine, hydroxyl, epoxy, acetoacetoxy, urea-formaldehyde, auto-oxidative groups that crosslink via oxidization, ethylenically unsatureated groups optionally with U.V. activation, olefinic and hydrazide groups, blocked isocyanates, and the like, and mixtures of such groups and the same groups in protected forms (so crosslinking can be delayed until the composition is in its application (e.g., applied to a substrate) and coalescence of the particles has occurred) which can be reversed back into original groups from which they were derived (for crosslinking at the desired time).

Other suitable compounds providing crosslinkability include thioglycolic acid, 2,6-dihydroxybenzoic acid, and the like, and mixtures thereof.

(v) Catalysts

The prepolymer may be formed without the use of a catalyst if desired but using a catalyst may be preferred in some instances. Examples of suitable catalysts include stannous octoate, dibutyl tin dilaurate, and tertiary amine compounds such as triethylamine and bis-(dimethylaminoethyl)ether, morpholine compounds such as beta,beta-dimorpholinodiethyl ether, bismuth carboxylates, zinc bismuth carboxylates, iron (III) chloride, potassium octoate, potassium acetate, and DABCO® (diazabicyclo[2.2.2]octane), from Air Products.

A preferred catalyst is a mixture of 2-ethylhexanoic acid and stannous octoate, e.g., FASCAT®. 2003 from Elf Atochem North America.

(vi) Ingredient Proportions

Normally, the prepolymer produced in the present invention will be isocyanate-terminated. For this purpose, the ratio of isocyanate to active hydrogen in the prepolymer typically ranges from about 1.3/1 to about 2.5/1, preferably from about 1.5/1 to about 2.1/1, and more preferably from about 1.7/1 to about 2/1.

The typical amount of water-dispersibility enhancing compound in the prepolymer will be up to about 50 wt. %, more typically from about 2 wt. % to about 30 wt. %, and more especially from about 2 wt. % to about 10 wt. % based on the total weight of the prepolymer.

The amount of optional compounds having crossliilkable functional groups in the prepolymer will typically be up to about 1 milliequivalent, preferably from about 0.05 to about 1 milliequivalent, and more preferably from about 0.1 to about 0.8 milliequivalent per gram of final polyurethane on a dry weight basis. In one embodiment the composition will be substantially free of vegetable oils or modified vegetable oil (alkyds). Substantially free of can be less than 5 wt. %, desirably less than 1 wt. %, and preferably less than 0.1 or 0.01 wt. % base on the weight of the film forming components (i.e., dispersion less water and readily volatile organic solvents).

The amount of catalyst used to form the prepolymer will typically be from about 5 to about 200 parts per million of the total weight of prepolymer reactants.

KETONE FUNCTIONAL MOLECULES/OLIGOMERS (MOIETIES)

In one embodiment, a preferred ketone functional moiety refers to a low molecular weight mono or poly ketone or mono or poly aldehyde (excluding formaldehyde) reactant generally below 2000 Dalton number average molecular weight. These can be low molecular weight ketones and aldehydes, or the can be reaction products of low molecular weight ketones and aldehydes with other reactants (e.g., reacted with epoxy compounds, polyols, amines, isocyanates, etc., to build molecular weight or couple multiple ketones or aldehydes together). The chemistry to couple low molecular weight ketones and aldehydes is well known. Three viable alternatives include a) polymerizing ketone or aldehyde containing unsaturated monomers (optionally with other unsaturated monomers present), b) making higher molecular weight species by condensation reactions, or c) reactions of vinyl groups with amines (Michael addition reaction). The polymerization reaction mechanism and monomers are further set forth in U.S. Pat. No. 4,983,662 in column 13 line 59 through column 15, line 10. The condensation reaction mechanism to create higher molecular ketone or aldehyde moiety(ies) would include starting with low molecular weight ketones or aldehydes such as a) dihydroxyacetone reacted with a mono or polyisocyanate, b) reacting levulinic acid with diol or polyol and condense to form hydroxyl functional ketone optionally coupled with di or polyisocyanate, or c) levulinic acid (4-oxopentanoic acid) reacted with an epoxidized Bis-phenol A. Another Michael addition reaction is shown in U.S. Pat. No. 4,983,662 Example 2 where diethanolamine, diacetoneacryamide are reacted in NMP to form a carbonyl-functional diol. Formaldehyde is not included in the ketone and/or aldehyde reactants because reactions between the hydrazine and formaldehyde are different than those of other aldehydes and ketones and desirably in some embodiments the aqueous dispersion of polyurethane is free of reaction products of formaldehyde and hydrazine.

In one embodiment of the invention, an epoxy resin such as a diglycidyl ether terminated resin is reacted with an organic carboxylic acid as shown in the reaction schematic below. The reaction occurs as the epoxy groups are esterified by a ring opening reaction. Levulinic acid could be substituted for one or more of the organic acids to form a mono or poly ketone functional epoxy oligomers. The resulting product contains hydroxyl groups formed from the ring-opening of the oxmane moiety. These hydroxyl groups contain active hydrogen atoms and are co-reactive with the isocyanate groups contained in the polyisocyanate compound during prepolymer formation and allow the pendant ketone to be polymerized into the prepolymer backbone if added during prepolymer formation. In the schematic, R'C(O)OH represents any ketone/aldehyde functional organic group. In one aspect of the invention, the organic acid is levulinic acid.

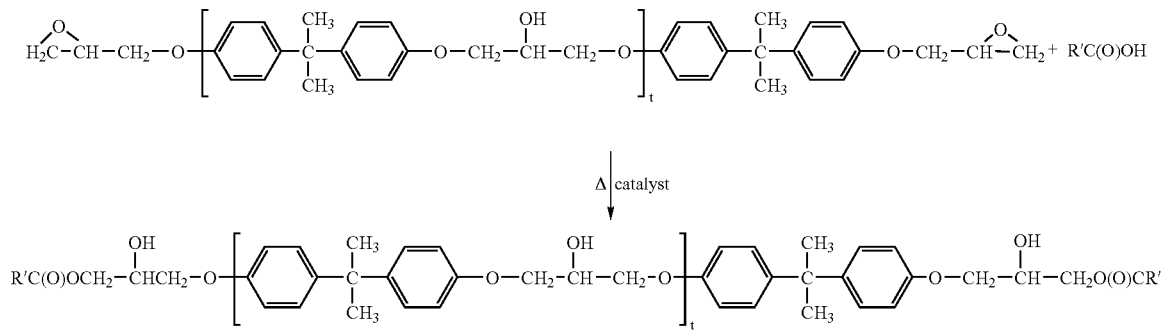

wherein t represents the extent of polymerization. In one aspect of the invention t is an integer from 0 to 18.

By way of example, the polyhydric alcohol can be selected from polyhydric phenols, aliphatic diols, cycloaliphatic diols, polyether polyols, aliphatic dicarboxylic acids, and the like obtained by reacting the polyhydric alcohol with an epihalohydrin, e.g., epichlorohydrin.

The polyhydric phenols include but are not limited to bisphenol A (p,p'-dihydroxydiphenyl propane), resorcinol, hydroquinone, 4,4'-dihydroxybenzophenone, 4,4'-dihydroxybiphenyl and novolak resins containing more than two phenol moieties linked through methylene bridges. Epoxy resins derived from bisphenol A are commercially available under the Epon® trademark from Resolution Performance Products LLC, Houston, Tex.

In an embodiment, the ketone functional molecule is made from a reaction of a C3-C20 ketone or aldehyde containing carboxylic acid with a polyepoxy compound such as epoxidized triglyceride oil (for example, epoxidized soybean oil or linseed oil), other epoxidized polyesters, or an epoxidized polyol. In another embodiment, the ketone functional molecule is derived from the reaction of a C3-C20 ketone or aldehyde containing carboxylic acid with a polyol (via simple esterification) as set forth below. The ketone functional molecule may be modified with a mono-isocyanate or coupled with polyisocyanate or polycarboxylic acid in a separate step from the urethane polymer or prepolymer formation step. These coupled materials will desirably not have an basic nitrogen nearby as discussed elsewhere that might inhibit azomethine formation. They can exceed 2000 molecular weight.

The reaction between the C3-20 ketone or aldehyde containing carboxylic acid and the polyepoxy compound is desirably catalyzed to reduce the reaction time and reaction temperature. Catalysts include trialkylamines, phosphines such as triphenylphosphine, clromium catalysts, etc. In one embodiment, the C3-C20 (i.e., having 3 to 20 carbon atoms) ketone or aldehyde containing carboxylic acid is a C3 to C10 species. In another embodiment, it is a C3 to C6 species. In one embodiment, it comprises a ketone containing species. A preferred C3-C20 ketone or aldehyde containing carboxylic acid is levulinic acid (γ-ketovaleric acid; acetylpropionic acid, 4-oxopentanoic acid) or pyruvic acid (α-ketopropionic acid; acetylformic acid).

The triglyceride oils are unsaturated vegetable oils and animal fats generally considered to be derived from condensation reactions of various fatty acids and glycerol. While the triglycerides are often described as oils, they may be solids at room temperature. The higher the amount of unsaturation present the higher the degree of epoxidation possible under similar reaction conditions. Reactions of these oils with unsaturation with strong oxidizers can convert the carbon to carbon double bond in the fatty acids to epoxides; peracetic acid being a common strong oxidizer for this purpose. Epoxidized vegetable oils are commercially available from companies such as Dow and Chemtura. The oxirane oxygen content is generally characterized from about 7-10 or 12% by weight. The oxirane oxygen value is determined by a nonaqueous potentiometric titrimetry using perchloric acid in the presence of tetraethylaminonium bromide. Epoxidized soybean and linseed oils are both used as plasticizers and sometimes as acid scavengers.

In another embodiment, the epoxidized material reacted with a C3-C20 ketone or aldehyde carboxylic acid is a synthetic polyester formed from condensation reactions of one or more polyols and one or more mono or polycarboxylic acids. In one embodiment, this polyester is aliphatic polyester and generally has one or less urethane linlkages. This polyester is desirably epoxidized similarly to the vegetable oil via a strong oxidizer reacting with unsaturation in the polyester. Desirably, one or more of the polyol or mono or polycarboxylic acid used to make the polyester was unsaturated, optionally with conjugated unsaturation. The polyol can have from 2 to 10 or 15 hydroxyl groups. In one embodiment, the polyol can be aromatic, alkyl substituted aromatic or aromatic substituted alkyl 6 to 20 carbon atoms. In another embodiment, the polyol can be aliphatic linear, branched, or cyclic with 2 to 20 carbon atoms. Aliphatic polyols are slightly preferred. Examples of polyols include pentaerythritol, dipentaerythritol, etc.; glycerol, polyglycerol, etc.; trimethylolpropane, neopentyl glycol, sorbitol, etc. In one embodiment, the polyol will have from 2 or 3 to about 6 hydroxyl groups. Generally, the polyol will be saturated. Generally, the carboxylic acids can be mono, di or polycarboxylic acids. They may be fatty acids such as derived from the hydrolysis of vegetable oils. The carboxylic acids desirably have from about 2 to about 25 carbon atoms and in one embodiment average about 1 to 3 unsaturated carbon to carbon bonds per acid. They may include other heteroatom functionality such as a hydroxyl group in ricinoleic acid.

In another embodiment, the C3 to C20 ketone or aldehyde containing carboxylic acid is reacted with di or poly hydroxyl functional polyol or an epoxidized version thereof such as 1) a C2-C20 linear, branched, or cyclic aliphatic or aromatic alcohol; 2) a self condensation reaction product for one or more C2-C20 linear, branched, or cyclic aliphatic or aromatic alcohol; 3) an C2-C4 alkoxylate extended C2-C20 linear, branched, or cyclic aliphatic or aromatic alcohol; and/or 4) an C2-C4 alkoxylate extended a self condensation reaction product for one or more C2-C20 linear, branched, or cyclic aliphatic or aromatic alcohol. The term aliphatic or aromatic is intended to include both aliphatic substituted aromatic and aromatic substituted aliphatic alcohols. In an embodiment each of the above di or poly hydroxy polyols is first functionalized with two or more epoxy groups before reacting with the C3-C20 ketone or aldehyde containing carboxylic acid. In one embodiment, the C3-C20 ketone or aldehyde containing carboxylic acid is levulinic acid or pyruvic acid. In another embodiment, the C3-C20 ketone or aldehyde containing carboxylic acid is a ketone containing molecule. In embodiment 1), C2-C20 alcohol functionalized with two or more epoxy groups can be things like trimethylol propane, pentaerytlritol, neopentyl glycol, etc., reacted with epichlorohydrin and then converted to epoxy group(s) by dehydrochlorination. In another embodiment 2), a self condensation reaction product for one or more C2-C20 linear, branched, or cyclic aliphatic alcohol functionalized with two or more epoxy groups per molecule can be things like polyglycerol, dipentaerytritol, tripentaerythritol, etc., reacted with epichlorohydrin and then dehydrochlorinated. In another embodiment 3), an C2-C4 alkoxylate extended C2-C20 linear, branched, or cyclic aliphatic alcohol functionalized with two or more epoxy groups per molecule can be things like ethoxylated, propoxylated etc., polyhydric alcohols as described under item 1, and thereafter epoxidized as set forth above. In another embodiment 4), a C2-C4 alkoxylate extended self condensation reaction product from one or more C2-C20 linear, branched, or cyclic aliphatic alcohol functionalized with two or more epoxy groups per molecule may be things like alkoxylated dipentaerythritol that is functionalized with epoxy groups. The polyols can be the earlier hydrocarbon polyols coupled with polyisocyaniate reactions. The ketone functional molecule can be modified with a mono-isocyanate or coupled with a polyisocyanate or polycarboxylic acid. This might involve reacting two moles of levulinic acid with one mole of epoxy difunctional bisphenol A and then coupling with 0.5 moles of a diisocyanate such as isophorone diisocyante or hexane diisocyanate In one embodiment, it is preferred not to have multiple urethane linkages in the ketone functional molecule (i.e., to have one urethane linkage or less than one urethane linkage per ketone molecule).

For the purpose of this application, polyepoxides are molecules with two or more epoxy groups per molecule. In one embodiment, the number of hydroxyl or epoxide groups is between 2 and 20, in another embodiment between 2 and 10 and in another between 2.5 and 6. When the polyketone is made from epoxidized polyols, the epoxidized polyol is primarily used as a coupler of two or more C3-C20 ketone or aldehyde containing carboxylic acids to form a polyketone molecule. While the ketone or aldehyde containing carboxylic acids might be reactive with simple hydroxyl groups without epoxidation, the reactivity of the epoxide functional molecules is slightly higher with the carboxylic acids.

While not wishing to be bound by theory, it appears as if the reaction products of the ketone functional moieties and hydrazine functional moieties can contribute enough entanglements of high molecular weight polyurethane to the composition after film formation to give the final film more desirable properties such as harder, more scratch resistant, more scuff resistance, better chemical resistance, etc. Lower molecular weight ketone containing species and lower molecular weight hydrazine moiety containing species can also improve coalescence so that films with better cohesion or requiring less coalescing aid are possible. Coalescing aids are often volatile organic compounds that may be subject to legislative reduction or elimination. While the ketone and/or hydrazine functional moieties do not need to be attached to polymer chains, the inclusion of polymer attached reactive moieties (either ketone and/or hydrazine) in combination with lower molecular weight functional moiety containing species is anticipated by this disclosure.

A preferred ketone functional molecule in one embodiment derived from triglycerides or polyesters refers to medium to high molecular weight mono of poly ketone or mono or poly aldehyde (excluding formaldehyde) reactant generally from about 500 to 50,000, in one embodiment from 500 to 20,000, and in still another embodiment from about 500 to about 5,000 or 10,000 Dalton number average molecular weight. These can be formed by any reaction mechanism as discussed later but ester linlkages between the ketone containing acid and epoxidized unit are preferred and more preferred is with the epoxidized triglyceride. In one embodiment with higher molecular weight ketone molecule (e.g., above 2000 number average molecular weight), one urethane linkage or less is desirable and/or linkages from vinyl polymerization are present at concentrations of one or less per molecule.

In one embodiment where the polyketone is derived from polyols, epoxidized polyols or epoxidized alkoxylate extend polyols, the starting molecular weight of these materials can be lower than the triglycerides, the number average molecule weight of the ketone function molecule can vary from about 150 to about 50,000 Daltons, more desirably from about 150 to about 20,000, and preferably from about 150 to about 5,000 or 10,000.

The ketone or aldehyde functional groups are generally not blocked (e.g., temporarily reacted with a removable chemical moiety to avoid premature reaction), although in some embodiments it might be desirable to block some ketone or aldehyde functional groups for specific requirements.

Where the compositions of the invention incorporate non-polyurethanic non-vinylic polycarbonyl compound(s) and/or oligomeric urethane polycarbonyl compounds, the level of such polycarbonyl compound(s) is desirably that to provide a range of 0.05 to 20 moles carbonyl groups per mole of hydrazine (or hydrazone) groups present, more desirably 0.1 to 10 moles per mole; and preferably 0.9 to 1.5 moles per mole. Examples of suitable polycarbonyl compounds are di-or poly-ketones, di-or poly-aldehydes, and aldehyde-ketones such as glyoxal, 2,5-hexanedione, glutaric dialdehyde, succinic dialdehyde, acetyl acetone, acetonyl acetone, and acetone dicarboxylic acid ester.

The proportion of carbonyl functional groups in the free radically polymerized polymer (if such is present) is preferably 3 to 200 milliequivalents per 100 g polymer (more preferably 6 to 100 milliequivalents per 100 g polymer).

HYDRAZINE FUNCTIONAL MOLECULES/OLIGOMERS (MOIETIES)

The preferred hydrazine functional moiety refers to a low molecular weight molecule or oligomers having one or more hydrazine or hydrazone groups. By a hydrazine functional group is meant the functional group of formula —NHNH$_2$. A hydrazone functional group is a group derived from such a hydrazine group by reaction with a monoketone or monaldehyde containing at least 2 carbon atoms. Hydrazine functional moieties can also be dihydrazides and other polyhydrazides as expressed below in that these molecules have the specified —NHNH$_2$ group.

While hydrazine itself (H$_2$N—NH$_2$) at elevated concentrations raises concerns about worker exposure, hydrazide (—NHNH$_2$) containing molecules are less of an exposure issue and offer the opportunity to build molecular weight and/or crosslink molecules/oligomers/polymers after polyurethane dispersion coagulation/film formation at or around room temperature. Volatile amines can play a significant role in the reactions using hydrazine functional moieties as the amines are/can be used in polyurethane dispersions to adjust the pH to the basic side before coalescence and allow the pH to shift to the acid side as the water and volatile amines evaporate. This pH shift and water evaporation promotes the reaction of hydrazine groups with available ketone or aldehyde groups (providing molecular weight buildup and or crosslinking).

The hydrazine functional moieties can be prepared from lower molecular weight hydrazine/hydrazide containing moieties or they can be prepared by reacting hydrazine ($H_2N$—$NH_2$) with mono or poly a) carboxylic acids, b) ketones, or c) aldehydes. Such a reaction would be the reaction of two moles of hydrazine with adipic acid to form the dihydrazide of adipic acid. U.S. Pat. No. 4,983,662 sets forth in column 17, line 44, through column 18, line 42, other hydrazine functional moieties and their source or preparation technique. Examples of preparations and use of hydrazine functional moiety(ies) is set forth in Examples 3, 4, and 5 of the same patent.

Alternatively, the hydrazine functional moieties can be prepared from polymerizing vinyl containing monomers to form oligomers or polymers and then functionalizing said oligomers or polymers by reacting acid, ketone, or aldehyde groups with hydrazine. This is more fully set forth in U.S. Pat. No. 4,983,662 in column 15 line 11, column 16, and line 49. Therein, it uses the term-pendant hydrazinolysable groups to describe groups that can be pre or post polymerization be converted to hydrazine or hydrazone groups by reacting with hydrazine ($H_2N$—$NH_2$). In this application, the hydrazine functional moiety preferable includes at least one non-polymeric (i.e., less than 2000 Dalton, more preferably less than 1000 Dalton number average molecular weight) hydrazine functional moiety.

Polymeric hydrazine and/or ketone functional polymers may be present and may co-react with the non-polymeric reactants but the polymeric versions of the ketone and hydrazine functional moieties are not required.

Suitable groups for hydrazinolysis are e.g., acid, acid halide and (especially) ester groups. The polymer VII may be a homopolymer but is more usually a copolymer of at least two monomers. Examples of monomers providing chain-pendant hydrazinolysable groups include crotonic acid, alpha-chloracrylic acid and especially acrylic acid, and acid chlorides or esters thereof, and also methacrylic acid and acid chlorides or esters thereof. There are advantageously used acrylic acid esters of alcohols of low molecular weight, such as methyl, ethyl, propyl, isopropyl, n-butyl or secondary butyl esters. As further co-monomers (not providing hydrazinolysable groups) which can be used to form hydrazine functional moieties there may be used, for example, vinyl halides such as vinyl chloride, vinyl fluoride or vinylidene chloride; vinyl-aryl-compounds such as styrene or substituted styrenes. There may also be used polymerizable olefines, such as isobutylene, butadiene or 2-chlorobutadiene, or heterocyclic compounds containing at least one vinyl group such as the various vinyl-pyridines.

When a hydrazone-containing vinyl polymer or oligomer is required, the hydrazine groups may be converted to hydrazone groups by reacting the hydrazine functional moiety with a saturated monoketone or monaldehyde containing at least two carbon atoms and preferably of boiling point 30 to 200° C. Examples of such compounds include, for example, aliphatic ketones or aldehydes, such as acetone, ethyl methyl ketone, di-isopropyl ketone, etc.

The polyurethane polymer(s) and the ketone functional moiety and hydrazine functional moiety of the composition of the invention may be brought together by any suitable technique.

Where the compositions of the invention incorporates non-polyurethanic non-vinylic polyhydrazine (or polyhydrazone) compound(s) and/or oligomeric urethane polyhydrazine (or polyhydrazone) compound(s), the level of such polyhydrazine (or polyhydrazone) compounds(s) in one embodiment is that to provide a range of 0.05 to 20 moles hiydrazine (or hydrazone) groups present per mole of carbonyl groups present, in another embodiment 0.1 to 10 moles per mole, and in another embodiment 0.67 to 1.11 moles per mole. Examples of such suitable polyhydrazine (or polyhydrazone) compounds include dicarboxylic acid bishydrazides of formula

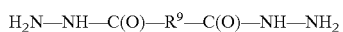

and dicarboxylic acid bis-hydrazones of formula.

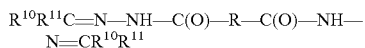

wherein $R^9$ is a covalent bond or a polyalkylene (preferably polymethylene) or alicyclic group having from 1 to 34 carbon atoms or a divalent aromatic ring, and $R^{10}$ and $R^{11}$ are selected from the group consisting of H and ($C_1$ to $C_6$) alkyl and alicyclic groups. Examples of suitable dihydrazides include oxalic acid dihydrazide, malonic acid dihydrazide, succinic acid dihydrazide, glutaric acid dihydrazide, adipic acid dihydrazide cyclohexane dicarboxylic acid bis-hydrazide, azelaic acid bis-hydrazide, and sebacic acid dihydrazide. Other suitable compounds are set forth in U.S. Pat. No. 4,983,662 at column 18, line 3 through column 18, line 42.

The compositions of the invention may optionally contain 0.0002 to 0.02 mole per mole of hydrazine group(s) of a heavy metal ion. This may be added in the form of suitable water-soluble metal salts, particularly chlorides, sulphates, metal hydrazide complexes, and acetates. Suitable heavy metal water-soluble salts are, in particular, those of Cu, Zn, Fe, Cr, Mn, Pb, V, Co and Ni.

PREPOLYMER MANUFACTURE

Aqueous dispersions of polyurethane composition particles are made in accordance with this invention by forming a blend of the polyurethane prepolymer and then dispersing this blend in aqueous medium.

Typically, prepolymer formation will be done by bulk or solution polymerizing the ingredients of the prepolymer. Thus, the ingredients forming the prepolymer, e.g., the polyisocyanate(s), the active hydrogen-containing compound(s) and/or the water-dispersibility enhancing compound(s), are combined to form the prepolymer. Alternatively, the ketone functional molecules/oligomers can be combined with the prepolymer at any time during prepolymer formation, i.e., at any time during the bulk/solution polymerization reaction or subsequent thereto during the dispersion forming process. The ketone functional molecule(s)/oligomer(s) can also be combined with the prepolymer after polymerization is substantially or even totally completed, if desired.

Bulk and solution polymerization are well known techniques and described, for example, in "Bulk Polymerization," Vol. 2, pp. 500-514, and "Solution Polymerization," Vol. 15, pp. 402-418, *Encyclopedia of Polymer Science and Engineer-* ing,© 1989, John Wiley & Sons, New York. See, also, "Initiators," Vol. 13, pp. 355-373, Kirk-Othlner, *Encyclopedia of Chemical Technology,*© 1981, John Wiley & Sons, New York. The disclosures of these documents are also incorporated herein by reference.

In one embodiment, the ketone functional molecule(s)/oligomer) should be combined with the prepolymer and/or its reactants so that a blend or mixture, preferably an intimate admixture, of the prepolymer mass and the ketone functional molecule(s)/oligomer(s) is formed when the mixture is dispersed in water. In another embodiment, the ketone functional molecule(s) oligomer can be added separately to the dispersion.

DISPERSION IN AN AQUEOUS MEDIUM

Once the polyurethane prepolymer blend is formed, it is dispersed in an aqueous medium to form a dispersion of the blend. If the ketone functional molecule(s)/oligomer(s) are combined with the prepolymer while it is in the form of a continuous oleophilic mass rather than discrete particles or droplets in water, the dispersed particles that are formed are composed of an intimate mixture of ketone functional molecule(s)/oligomer(s) and the prepolymer.

Dispersing the prepolymer in aqueous medium can be done by any conventional technique, in the same way that other polyurethane prepolymers made by bulk or solution polymerization are dispersed in water. Normally, this will be done by combining the prepolymer blend, with water with mixing. Where solvent polymerization is employed, the solvent and other volatile components can optionally be distilled off from the final dispersion, if desired. Chain extender and/or the hydrazine functional moiety for reacting with the ketone group can be added at this stage or later.

In one embodiment of the invention, where the prepolymer includes enough water-dispersibility enhancing compound to form a stable dispersion without added emulsifiers (surfactants), the dispersion can be made without such compounds, i.e., substantially free of surfactants, if desired. The advantage of this approach is that the coatings or other products made from the polyurethane exhibit less water sensitivity, better film formation, less foaming and reduced growth of mold, bacteria and so forth.

PREPOLYMER NEUTRALIZATION

In those instances in which the prepolymer includes water-dispersibility enhancing compounds which produce pendant carboxyl groups, these carboxyl groups can be converted to carboxylate anions for enhancing the water-dispersibility of the prepolymer.

Suitable neutralizing agents for this purpose include tertiary amines, metal hydroxides, ammonium hydroxide, phosphines, and other agents well known to those skilled in the art. Tertiary amines and ammonium hydroxide are preferred, such as triethyl amine (TEA), dimethyl ethanolamine (DMEA), N-methyl morpholine, and the like, and mixtures thereof. It is recognized that primary or secondary amines may be used in place of tertiary amines, if they are sufficiently hindered to avoid interfering with the chain extension process.

CHAIN EXTENSION

The polyurethane composition dispersions in water produced as described above can be used as is, if desired. Alternatively, they can be chain extended to convert the prepolymers in the composite particles to more complex polyurethanes.

As a chain extender, at least one of water, inorganic or organic polyamine having an average of about 2 or more primary and/or secondary amine groups, amine functional polyols, ureas, or combinations thereof is suitable for use in this invention. Suitable organic amines for use as a chain extender include diethylene triamine (DETA), ethylene diamine (EDA), meta-xylylenediamine (MXDA), aminoethyl ethanolamine (AEEA), 2-methyl pentane diamine, and the like, and mixtures thereof. Also suitable for practice in this invention are propylene diamine, butylene diamine, hexamethylene diamine, cyclohexylene diamine, phenylene diamine, tolylene diamine, 3,3-dichlorobenzidene, 4,4'-methylene-bis-(2-chloroaniline), 3,3-dichloro-4,4-diamino diphenylmethane, sulfonated primary and/or secondary amines, and the like, and mixtures thereof. Suitable inorganic amines include hydrazine, substituted hydrazines, and hydrazine reaction products, and the like, and mixtures thereof. Suitable ureas include urea and it derivatives, and the like, and mixtures thereof. Hydrazine is most preferred or hydrazine combined with other extenders, preferably water soluble ones such as ethylene diamine and is most preferably used as a solution in water. The amount of chain extender, which can be added before or after dispersion, typically ranges from about 0.5 to about 1.1 equivalents based on available equivalents of isocyanate.

ADDITIONAL INGREDIENTS AND FEATURES

The polyurethane prepolymers, the product polyurethanes produced therefrom, and the aqueous prepolymer composition aqueous dispersions of the present invention as described above can be made with various additional ingredients and features in accordance with known polyurethane technology. Examples include:

(i) Polymer Branching

Branching of the ultimate polymer product, as well as the prepolymer, can be accomplished for aiding tensile strength and improving resistance to creep-that is, recovery to that of or near its original length after stretching. In this regard, see U.S. Published Patent Application No. 2003195293, the disclosure of which has been incorporated herein by reference above.

(ii) Monofunctional Active Hydrogen-Containing Compounds

The prepolymers of this invention can also be made with monofunctional active hydrogen-containing compounds to enhance dispersibility of the prepolymer in aqueous medium and impart other useful properties, for example cross-linkability, as well as to adjust the morphology and rheology of the polymer when coated onto a substrate, as also described in the above-noted U.S. Published Patent Application No. 2003195293.

(iii) Plasticizers

The polyurethane prepolymers and ultimate polyurethane products of this invention can be prepared in the presence of a plasticizer. The plasticizer can be added at any time during prepolymer preparation or dispersion or to the polyurethane during or after its manufacture. Plasticizers well known to the art can be selected for use in this invention according to parameters such as compatibility with the particular polyurethane and desired properties of the final composition. See, for example, WO 02/08327 A1, as well as the above-noted U.S. Published Patent Application No. 2003195293.

(iv) Other Additives for Preparation of Dispersions

Other additives well known to those skilled in the art can be used to aid in preparation of the dispersions of this invention. Such additives include stabilizers, defoamers, antioxidants (e.g., Irganox 1010), UV absorbers, carbodiimides, activators, curing agents, stabilizers such as carbodiimide, colorants, pigments, neutralizing agents, thickeners, non-reactive and reactive plasticizers, coalescing agents such as di(propylene glycol) methyl ether (DPM), waxes, slip and release agents, antimicrobial agents, surfactants such as Pluronic™ F68-LF and IGEPAL™ C0630 and silicone surfactants, metals, coalescents, salts, flame retardant additives (e.g., antimony oxide), antiozonants, and the like. They can optionally be added as appropriate before and/or during the processing of the dispersions of this invention into finished products as is well known to those skilled in the art. Additives may also be used as appropriate in order to make articles or to treat other products (such as by impregnation, saturation, spraying, coating, or the like). The dispersions of this invention typically have total solids of at least about 20 wt. %, preferably at least about 25 wt. % and more preferably at least about 30 wt. %.

(v) Blends with Other Polymers and Polymer Dispersions

The dispersions of this invention can be combined with commercial polymers and polymer dispersions by methods well known to those skilled in the art. Such polymers and dispersions include those described in WIPO Publication WO 02/02657 A2, U.S. Pat. No. 4,920,176, U.S. Pat. No. 4,292,420, U.S. Pat. No. 6,020,438, U.S. Pat. No. 6,017,997 and a review article by D. P. Tate and T. W. Bethea, Encyclopedia of Polymer Science and Engineering, Vol. 2, p. 537, the disclosures of which are incorporated herein by reference.

Similarly, the dispersions of this invention can be formed by dispersing the prepolymer mixture in a previously formed aqueous dispersion of another polymer or polymers and/or nanoparticles. In other words, the aqueous medium into which the prepolymer mixture is dispersed in accordance with the present invention can be a previously formed aqueous dispersion of another polymer or polymers including those made by emulsion and suspension polymerization techniques and/or nanoparticles (or vice versa where one would disperse another urethane into the inventive urethane dispersion).

(vi) Hybrids with Other Polymers

The aqueous dispersions of this invention can also be used as seed polymers for forming hybrids of polyurethanes with other polymers. This can be done by forming the aqueous dispersions of polyurethane composite in the manner described above and then polymerizing additional monomers by emulsion or suspension polymerization in the presence of these dispersions, i.e., with the inventive dispersions being mixed with the additional monomers before polymerization is completed. Hybrids of polyurethanes and acrylics can be made to advantage by this approach.

Still another way of making hybrid polymers in accordance with the present invention is to include ethylenically unsaturated monomers in the polyurethane prepolymer reaction system and to cause these monomer to polymerize when or after the prepolymer is dispersed in aqueous medium. In this approach, the ethylenically unsaturated monomers act as a diluent during prepolymer formation. In the aqueous medium, these ethylenically unsaturated monomers can be polymerized to completion with or without additional monomers being added. Hybrids of polymethanes and acrylics can be made to advantage by this approach, as well.

This technology is taught in U.S. Pat. No. 4,644,030; U.S. Pat. No. 4,730,021; U.S. Pat. No. 5,137,961; and U.S. Pat. No. 5,371,133. Another urethane-acrylic hybrid is often known as synthetic alloy urethane-acrylic where a urethane polymer is dispersed into a waterborne polymer dispersion or emulsion. This is taught in WO 98/38249 and U.S. Pat. No. 6,022,925.

(vii) Water-Borne Energy Curable Polyurethane Compositions

It is already known that water-borne polyurethane and hybrid compositions that can be cured by application of energy (UV and IR radiation and/or electron beams) can be made by end-capping the polyurethane with (meth)acrylic esters and other ethylenically unsaturated monomers. This technology can be applied to this invention to provide energy-curable water-borne polyurethane coatings.

ALTERNATIVE METHODS OF MANUFACTURE

Described above is a typical way the dispersions of the present invention can be made, i.e., by forming a prepolymer blend in the substantial absence of water and then dispersing the blend in an aqueous medium with mixing. Other known ways of making aqueous polyurethane dispersions can also be used to make the dispersions of this invention. Examples are (i) Shear Mixing Dispersing the prepolymer by shear forces with emulsifiers (external emulsifiers, such as surfactants, or internal emulsifiers having nonionic, anionic, cationic and/or zwitterionic groups as part of or pendant to the polyurethane backbone, and/or as end groups on the polyurethane backbone).

(ii) Acetone Process.

A prepolymer is formed with or without the presence of acetone, MEK, and/or other polar solvents that are non-reactive and easily distilled. The prepolymer is further diluted in said solvents as necessary, and optionally chain extended with an active hydrogen-containing compound. Water is added to the (optionally chain-extended or during chain extension to control viscosity) polyurethane, and the solvents are distilled off. A variation on this process would be to chain extend the prepolymer after its dispersion into water or into water containing chain extender.

(iii) Melt Dispersion Process.

An isocyanate-terminated prepolymer is formed, and then reacted with an excess of ammonia or urea to form a low molecular weight oligomer having terminal urea or biuret groups. This oligomer is dispersed in water and chain extended by methylolation of the biuret groups with formaldehyde.

(iv) Ketazine and ketimine processes.

Hydrazines or diainines are reacted with ketones to form ketazines or ketimines. These are added to a prepolymer, and remain inert to the isocyanate. As the prepolymer is dispersed in water, the hydrazine or diamine is liberated, and chain extension takes place as the dispersion is taking place.

(v) Continuous Process Polymerization.

An isocyanate-terminated prepolymer is formed. This prepolymer is pumped through high shear mixing head(s) and dispersed into water and then chain extended at said mixing head(s), or dispersed and chain extended simultaneously at said mixing head(s). This is accomplished by multiple streams consisting of prepolymer (or neutralized prepolymer), optional neutralizing agent, water, and optional chain extender and/or surfactant.

(vi) Reverse Feed Process.

Water and optional neutralizing agent(s) and/or extender amine(s) are charged to the prepolymer under agitation. The prepolymer can be neutralized before water and/or diamine chain extenders are added.

APPLICATIONS

Ketone functional molecule(s)/oligomer(s) can impart several useful properties to polymers including better film formation due to more low molecular weight components enhancing flow, higher crosslink density (improving mar and scratch resistance, barrier properties, flame retardance, chemical and stain resistance, higher tensile strength, UV stability, self assembly and so forth.

The aqueous polyurethane composite particle dispersions of the present invention, both in prepolymer and chain extended form, can be used to make coatings, adhesives, and films for porous and non-porous substrates such as papers, non-woven materials, textiles, leather, wood, concrete, masonry, metals with or without primer, plastics (e.g., polypropylene, polyester, polyurethane), house wrap and other building materials, fiberglass, polymeric articles, personal protective equipment (such as hazardous material protective apparel, including face masks, medical drapes and gowns, and firemen's turnout gear), and the like. Applications include papers and non-wovens; fibrous materials; films, sheets, composites, and other articles; inks and printing binders; flock and other adhesives; and personal care products such as skin care, hair care, and nail care products; livestock and seed applications; and the like. A preferred embodiment is use as a mar and scratch resistant interior or exterior coating, such as plastics coatings for vehicles and/or consumer electronics and/or wood floor coatings. As coating compositions, they may be applied by consumers or professionals by any conventional method including brushing, dipping, flow coating, spraying, and the like.

Any fibrous material can be coated, impregnated or otherwise treated with the compositions of this invention by methods well known to those skilled in the art, including carpets as well as textiles used in clothing, upholstery, tents, awnings, and the like. Suitable textiles include fabrics, yarns, and blends, whether woven, non-woven, or knitted, and whether natural, synthetic, or regenerated. Examples of suitable textiles include cellulose acetate, acrylics, wool, cotton, jute, linen, polyesters, polyamides, regenerated cellulose (Rayon), and the like.

The compositions of this invention can be used as adhesives or to augment or supplement adhesive types well known to those skilled in the art. For example, particular adhesive properties can be achieved by varying type and amount of isocyanate(s); type, amount, and molecular weight of polyol (s); and amount of poly(alkylene oxide) side chain units.

In addition, the principles of the present invention can be applied to other technologies for manufacturing aqueous polyurethane dispersions. For example, this invention can be applied to the technique for manufacturing plasticized polyurethane dispersions described in U.S. Pat. No. 6,576,702 by adding plasticizers to the polyurethane prepolymers described in that patent before they are dispersed in aqueous medium. Similarly, this invention can be applied to the technique for manufacturing breathable polyurethane dispersions (i.e., dispersions which form layers of breathable polyurethanes) described in U.S. Published Patent Application No. 2003195293, as well as to the technique for manufacturing core-shell polyurethane dispersions described in U.S. Published Patent Application No. 20050004306. The disclosures of the above patent and published applications are incorporated herein by reference.

EXAMPLE

The following examples are presented to illustrate this invention:

Example A

Ketone Diol Synthesis

A ketone functional diol was prepared by combining items 1-3 of the ingredients below in a neck flask equipped with a thermometer, overhead stirrer and nitrogen gas inlet. With stirring and under a nitrogen blanket, the temperature of the reaction mixture was raised to 100° C. to 103° C. and held at this temperature for 1 hour. The temperature was then raised to 110-114° C. and held there for an additional hour. Finally the reaction mixture was raised to 121-125° C. and held at this temperature for two hours or until the acid number was <1.0 (mg/g). The final material had a slight amber color and a viscosity of ~2200 cps at 70° C.

| Item # | Material | Parts |
|---|---|---|
| 1 | Bisphenol A diglycidyl ether (Epon 828) | 331.4 |
| 2 | Levulinic Acid | 202.1 |
| 3 | Triphenyl phosphine (TPP) | 4.0 |

Example 1

Ketone Functional PUD

A prepolymer was prepared by combining items 1-5 of the ingredients below at 60° C. to a 4 neck flask equipped with a thermometer, overhead stirrer and gas inlet. The reaction below was run under a stream of dry nitrogen introduced through the gas inlet on the reactor. The temperature of the reaction mixture was raised to 86° C. to 89° C. and held at this 30 minutes. Item 6 was then added and the temperature held at 86° C. to 89° C. for 2 hours or until the theoretical NCO % was reached as indicated by titration of a small sample.

| Item # | Material | Parts |
|---|---|---|
| 1 | Polyester from hexane diol, adipic acid & isophthalic acid (OH# = 37.0) | 823.2 |
| 2 | Ketone functional diol (From Example A, OH# = 184.2) | 411.6 |
| 3 | Dimethylolpropionic acid | 101.4 |
| 4 | N-methylpyrrolidone | 391.0 |
| 5 | Di-cyclohexylmethane di-isocyanate | 892.6 |
| 6 | Dabco T-9 (Stannous Octoate) | 0.3 |

A polyurethane dispersion was prepared by neutralizing the above prepolymer with 85.5 parts of triethylamine at 65° C.-70° C. and dispersing the neutralized prepolymer in water having an initial temperature of ~20-22° C. while maintaining the water/dispersion temperature below 28° C. The dispersed prepolymer was extended with an appropriate amount (typically 0.85 to 0.92 equivalents of amine reactive groups per equivalent of NCO) of hydrazine hydrate (35% hydrazine content) after the prepolymer was dispersed. After allowing the hydrazine to react 94.2 parts of adipic dihydrazide in 533.6 parts of warm (40-50° C.) water was added to give a 35.1% solids polyurethane dispersion with low sediment, a viscosity of 40 cps (at 25° C.) at a pH of 7.8.

Example 2

Ketone Functional PUD

This example demonstrates how an NMP free urethane-acrylic hybrid could be prepared using similar raw material employed in Example 1. A prepolymer was prepared by combining items 1-7 of the ingredients below at 60° C. to a 4 neck flask equipped with a thermometer, overhead stirrer and gas inlet. The reaction below was run under a stream of dry air introduced through the gas inlet on the reactor. The temperature of the reaction mixture was raised to 86° C. to 89° C. and held at this 30 minutes. Item 8 was then added and the temperature held at 86° C. to 89° C. for 2 hours or until the theoretical NOC % was reached as indicated by titration of a small sample.

| Item # | Material | Parts |
|---|---|---|
| 1 | Polyester from hexane diol, adipic acid & isophthalic acid (OH# = 37.0) | 748.7 |
| 2 | Ketone Functional Diol (From Example A, OH# = 184.2) | 374.4 |
| 3 | Dimethylolbutanoic acid | 102.0 |
| 4 | Methyl methacrylate | 559.7 |
| 5 | Butyl acrylate | 139.9 |
| 6 | BHT | 0.8 |
| 7 | Di-cyclohexylmethane di-isocyanate | 692.9 |
| 8 | Dabco T-9 (Stannous Octoate) | 0.3 |

A polyurethane dispersion was prepared by neutralizing the above prepolymer with 36.7 parts of triethylamine at 65° C.-70° C. and dispersing the neutralized prepolymer in water while maintaining the water/dispersion temperature below 28° C. The dispersed prepolymer was extended with an appropriate amount of hydrazine hydrate (35% hydrazine content) after the prepolymer was dispersed. After allowing about 30 minutes for chain extension the temperature of the dispersion was adjusted to 33-35° C. and 3 parts of a 1% solution Fe-EDTA complex, 40 parts of aqueous 3.5% tert-butyl hydrogen peroxide, and 55 parts of 2.0% aqueous erythorbic acid neutralized with triethylamine. An exotherm resulted indicating initiation and polymerization of the acrylic monomer present. To this dispersion adipic dihydrazide (ADH) was added to allow self-crosslinking between carbonyl/ketone groups in incorporated into the polymer via the carbonyl/ketone functional diol. This resulted in a 35.8% solids polyurethane dispersion with low sediment, a viscosity of 25 cps (at 25° C.) at a pH of 7.6.

Example B

Poly-Ketone Oligomer Synthesis

A poly-ketone functional oligomer was prepared by combining items 1-3 of the ingredients below in a 4 neck flask equipped with a thermometer, overhead stirrer and nitrogen gas inlet. With stirring and under a nitrogen blanket, the temperature of the reaction mixture was raised to 100° C. to 103° C. and held at this temperature for 1 hour. The temperature was then raised to 110-114° C. and held there for an additional hour. Finally the reaction mixture was raised to 121-125° C. and held at this temperature for two hours or until the acid number was <1.0 (mg/g). At this point item 4 was added, followed by the addition of item 5 at 90-94° C. The temperature was raised back up to 116-120° C. and maintained there until the titrated NCO for the resulting product was <0.1% (or essentially nil). The final material had a slight amber color and a viscosity of ~5,100 cps at 70° C.

| Item # | Material | Parts |
|---|---|---|
| 1 | Bisphenol A diglycidyl ether (Epon 828) | 331.4 |
| 2 | Levulinic Acid | 202.1 |
| 3 | Triphenyl phosphine (TPP) | 4.0 |
| 4 | Benzyl Benzoate | 152.6 |
| 5 | 1,6-Hexane Diisocyanate | 73.2 |

Example 3

Polyketone Oligomer and PUD

The objective of this example was to prepare a dispersion with similar "hard segment" content and quantity of ketone functional material (ketone equivalents) as contained in "Example 1". A prepolymer was prepared by combining items 1-5 of the ingredients below at 60° C. to a 4 neck flask equipped with a thermometer, overhead stirrer and gas inlet. The reaction below was rim under a stream of dry nitrogen introduced through the gas inlet on the reactor. The temperature of the reaction mixture was raised to 86° C. to 89° C. and held at this 30 minutes. Item 6 was then added and the temperature held at 86° C. to 89° C. for 2 hours or until the theoretical NCO % was reached as indicated by titration of a small sample. When the prepolymer reached the theoretical NCO, the prepolymer temperature was dropped to 60-64° C. and item 7 was added and homogenized into the prepolymer to neutralize (ionize) the prepolymer. Afterwards, item 8 was added and homogenized into the prepolymer at 60-64° C.

| Item # | Material | Parts |
|---|---|---|
| 1 | Polyester from hexane diol, adipic acid & isophthalic acid (OH# = 37.0) | 131.1 |
| 2 | Polyester from hexane diol, adipic acid & isophthalic | 66.5 |

-continued

| Item # | Material | Parts |
|---|---|---|
| | acid (OH# = 225.0) | |
| 3 | Dimethylolpropionic acid | 21.5 |
| 4 | N-methylpyrrolidone | 87 |
| 5 | Di-cyclohexylmethane di-isocyanate | 176.9 |
| 6 | Dabco T-9 (Stannous Octoate) | 0.1 |
| 7 | Triethylamine | 20.2 |
| 8 | Polyketone oligomer (from example B) | 147.8 |

The resulting neutralized prepolymer was dispersed in water having an initial temperature of ~20-22° C. while maintaining the water/dispersion temperature below 28° C. The dispersed prepolymer was extended with hydrazine hydrate (35% hydrazine content) after the prepolymer was dispersed. To the resulting dispersion (after no detectable NCO was observed via FTIR) 21.8 parts of adipic dihydrazide in 123.6 parts of warm (40-50° C.) water was added to give a 36.5% solids polyurethane dispersion with low sediment, a viscosity of 60 cps (at 25° C.) at a pH of 8.2.

Example 4

Polyketone Oligomer with Ketone Functional PUD

The objective of this example was to prepare a dispersion with similar "hard segment" content and quantity of ketone functional material (ketone equivalents) as contained in "Example 1". A prepolymer was prepared by combining items 1-6 of the ingredients below at 60° C. to a 4 neck flask equipped with a thermometer, overhead stirrer and gas inlet. The reaction below was run under a stream of dry air introduced through the gas inlet on the reactor. The temperature of the reaction mixture was raised to 86° C. to 89° C. and held at this 30 minutes. Item 7 was then added and the temperature held at 86° C. to 89° C. for 2 hours or until the theoretical NCO % was reached as indicated by titration of a small sample. When the prepolymer reached the theoretical NCO, the prepolymer temperature was dropped to 60-64° C. and item 8 was added and homogenized into the prepolymer to neutralize (ionize) the prepolymer. Afterwards, item 9 was added and homogenized into the prepolymer at 60-64° C. (at which temperature the secondary hydroxyls on the oligomer would not be expected to show significant reaction).

| Item # | Material | Parts |
|---|---|---|
| 1 | Polyester from hexane diol, adipic acid & isophthalic acid (OH# = 37.0) | 163.1 |
| 2 | Polyester from hexane diol, adipic acid & isophthalic acid (OH# = 225.0) | 40.7 |
| 3 | Ketone Diol (from example A) | 43.7 |
| 4 | Dimethylolpropionic acid | 21.5 |
| 5 | N-methylpyrrolidone | 82.5 |
| 6 | Di-cyclohexylmethane di-isocyanate | 155 |
| 7 | Dabco T-9 (Stannous Octoate) | 0.1 |
| 8 | Triethylamine | 19.4 |
| 9 | Polyketone oligomer (from example B) | 54.6 |

A polyurethane dispersion was prepared by dispersing the neutralized prepolymer in water while maintaining the water/dispersion temperature below 28° C. (initial water temperature ~21° C.). The dispersed prepolymer was extended with 0.6 equivalents (versus NCO content) of hydrazine hydrate (35% hydrazine content) followed shortly after ward by the addition of 0.32 equivalents (versus NCO content) of ethylene diamine (as a 25% solution in water) after the prepolymer was dispersed. To this dispersion (after no detectable NCO was observed via FTIR) adipic dihydrazide (ADH) is added to allow self-crosslinking between carbonyl/ketone groups. This resulted in a 37.2% solids polyurethane dispersion with low sediment, a viscosity of 20 (at 25° C.) at a pH of 8.0.

Example C

Poly-Ketone Oligomer Synthesis

A poly-ketone functional oligomer was prepared by combining items 1-3 of the ingredients below in a 4 neck flask equipped with a thermometer, overhead stirrer and nitrogin gas inlet. With stirring and under a nitrogen blanket, the temperature of the reaction mixture was raised to 100° C. to 103° C. and held at this temperature for 1 hour. The temperature was then raised to 110-114° C. and held there for an additional hour. Finally, the reaction mixture was raised to 121-125° C. and held at this temperature for two hours or until the acid number was <1.0 (mg/g). At this point item 4, 5 and 6 was added, followed by the addition of item 5 at 85-89° C. The temperature was raised back up to 110-114° C. and maintained there until the titrated NCO for the resulting product was <0.1% (or essentially nil). Residual isocyanate was also tracked via FTIR where the NCO peak would show up at 2160 cm$^{-1}$ and determined to be negligible. The final material had a slight amber color and a viscosity of ~1,600 cps at 70° C.

| Item # | Material | Parts |
|---|---|---|
| 1 | Bisphenol A diglycidyl ether (Epon 828) | 331.4 |
| 2 | Levulinic Acid | 202.1 |
| 3 | Triphenyl phosphine (TPP) | 4 |
| 4 | Benzyl Benzoate | 158.6 |
| 5 | N-methyl pyrrolidone | 88.1 |
| 6 | Methanesulfonic acid | 1.5 |
| 7 | Isophorone Diisocyanate | 96.7 |

Example 5

Ketone Functional PUD with Polyketone Oligomer

This example uses an alternative process versus that described in "Example 4". A prepolymer was prepared by combining items 1-5 of the ingredients below at 60° C. to a 4 neck flask equipped with a thermometer, overhead stirrer and gas inlet. The reaction below was run under a stream of dry air introduced through the gas inlet on the reactor. The temperature of the reaction mixture was raised to 115° C. to 120° C. and held at this temperature for 140 minutes or until the theoretical NCO was reached for this stage of the reaction as indicated by titration of a small sample. Item 6 was then added and the temperature held at 86° C. to 89° C. for an additional 1 hour or until the theoretical NCO % was reached as indicated by titration of a small sample. When the prepolymer reached the theoretical NCO the prepolymer temperature was dropped to 58-61° C. and item 7 was added and homogenized into the prepolymer (at which temperature the secondary hydroxyls on the diol would not be expected to show significant reaction, particularly given the temperature and time required to complete the first stage of the reaction). Afterwards, item 8 was added and homogenized into the prepolymer at 58-61° C. to neutralize (ionize) the prepolymer.

| Item # | Material | Parts |
|---|---|---|
| 1 | Polyester from hexane diol, adipic acid & isophthalic acid (OH# = 37.0) | 163.1 |
| 2 | Polyester from hexane diol, adipic acid & isophthalic acid (OH# = 225.0) | 40.7 |
| 3 | Ketone Diol (from example A) | 43.7 |
| 4 | N-methylpyrrolidone | 82.5 |
| 5 | Di-cyclohexylmethane di-isocyanate | 155 |
| 6 | Dimethylolpropionic acid | 21.5 |
| 7 | Polyketone oligomer (from example C) | 54.6 |
| 8 | Triethylamine | 19.4 |

A polyurethane dispersion was prepared by dispersing the neutralized prepolymer in water while maintaining the water/dispersion temperature below 28° C. (initial water temperature ~21° C.). The dispersed prepolymer was extended with hydrazine hydrate (35% hydrazine content) after the prepolymer was dispersed. To this dispersion (after no detectable NCO was observed via FTIR) 17.6 parts of adipic acid dihydrazide (ADH) in 100 parts of warm water is added to allow self-crosslinking between carbonyl/ketone groups. This resulted in a 35.8% solids polyurethane dispersion with low sediment, a viscosity of 65 cps (at 25° C.) at a pH of 7.6.

Example 6

Polyketone Oligomer and PUD

A prepolymer was prepared by combining items 1-5 of the ingredients below at 60° C. to a 4 neck flask equipped with a thermometer, overhead stirrer and gas inlet. The reaction below was run under a stream of dry nitrogen introduced through the gas inlet on the reactor. The temperature of the reaction mixture was raised to 86° C. to 89° C. and held at this 2.5 hours or until the theoretical NCO % was reached as indicated by titration of a small sample. When the prepolymer reached the theoretical NCO the prepolymer temperature was dropped to 58-61° C. and item 6 was added and homogenized into the prepolymer. Afterwards, item 7 was added and homogenized into the prepolymer at 58-C 61° C. to neutralize (ionize) the prepolymer.

| Item # | Material | Parts |
|---|---|---|
| 1 | Polyester from hexane diol, adipic acid & isophthalic acid (OH# = 37.0) | 268.0 |
| 2 | Trimethylol Propane | 12.0 |
| 3 | Dimethylolpropionic acid | 53.8 |
| 4 | N-methylpyrrolidone | 211.4 |
| 5 | Di-cyclohexylmethane di-isocyanate | 326.8 |
| 6 | Polyketone oligomer (from example C) | 185.0 |
| 7 | Triethylamine | 40.5 |

The resulting neutralized prepolymer was dispersed in water having an initial temperature of ~20-22° C. while maintaining the water/dispersion temperature below 28° C. The dispersed prepolymer was extended with 0.8 equivalents (versus NCO content) of hydrazine hydrate (35% hydrazine content) followed afterward by the addition of 0.12 equivalents (versus NCO content) of ethylene diamine (as a 25% solution in water). To the resulting dispersion (after no detectable NCO was observed via FTIR) 25.8 parts of adipic acid dihydrazide in 146.1 parts of warm (40-50° C.) water was added to give a 36.5% solids polyurethane dispersion with low sediment, a viscosity of 60 cps (at 25° C.) at a pH of 8.2.

The dispersion containing ADH gave coatings that exhibited excellent fingernail mar resistance and black heel mark resistance after 1 day at room temperature versus coatings of the same polymer dispersion without any ADH which could be categorized as poor in terms of mar and scuff resistance.

Example D

Poly-Ketone Oligomer Synthesis

The reaction was conducted in two stages. For the first stage of the reaction, to a 4-necked flask, fitted with a stirrer, thermometer, dean stark trap and a submerged gas inlet tube charged with 1340 g (10.0 mole) of 1,1,1-tris(hydroxymethyl) propane (TMP) and 2320 g (20.0 mole) of levulinic acid. The contents were heated slowly under nitrogen (1.0 scfh) to 45-50° C. to melt the TMP. To the reaction mixture was added 7.5 g of butyl stannoic acid and with continued stirring was heated up to 140-150° C. The water from reaction was distilled into a Dean Stark trap. The reaction mixture temperature was gradually heated to 185-190° C. in 5.5 hours, 362 g water was collected. The reaction mixture was held at 180-190° C. for one hour and an additional 6 g water was collected. The end of 4the first stage of the reaction generated a light straw colored oil in the flask which had a hydroxyl number of 150 and an acid number of 5.9. In the second stage of the reaction, the flask was charged with 1077.3 g of KP-140 (tri-(butyl cellusolve) phosphate. The temperature of the flask contents was adjusted to 55-60° C. while stirring under a nitrogen atmosphere (0.5 scfh). To the reaction mixture was added 1015.8 g (9.15 eq's, equal to the combined hydroxyl and acid eq.'s of the first stage product) of isophorone diisocyanate through an additional funnel over 15-20 minutes. The reaction temperature rose to 90-95° C. due to exothermal reaction. The reaction mixture was held at 90-95° C. for 4.5-5 hours until all diisocyanate was consumed (IR: NCO band at 2265 cm-1.

| Item # | Material | Parts |
|---|---|---|
| | 1st Stage of Reaction | |
| 1 | 1,1,1-Tris(hydroxymethyl)propane | 2320.0 |
| 2 | Levulinic Acid | 1340.0 |
| 3 | Butyl Stannoic acid | 7.5 |
| | 2nd Stage of Reaction | |
| 4 | KP-140 | 1077.3 |
| 5 | Isophorone Diisocyanate | 1015.8 |

Example 7

Polyketone Oligomer and PUD

A prepolymer was prepared by combining items 1-4 of the ingredients below at 60° C. in a 4 neck flask equipped with a thermometer, overhead stirrer and gas inlet. The reaction below was run under a stream of dry nitrogen introduced through the gas inlet on the reactor. The temperature of the reaction mixture was raised to 86° C. to 89° C. and held at this 2.5 hours or until the theoretical NCO % was reached as indicated by titration of a small sample. Item 5 was then added and the temperature held at 86° C. to 89° C. for an additional 1 hour or until the theoretical NCO % was reached as indicated by titration of a small sample. When the prepolymer reached the theoretical NCO, the prepolymer temperature was dropped to 58-61° C. and item 6 was added and homogenized into the prepolymer. Afterwards, item 7 was added and homogenized into the prepolymer to neutralize (ionize) the prepolymer (at 58-61° C. prepolymer temperature).

| Item # | Material | Parts |
|---|---|---|
| 1 | Polyester from hexane diol, adipic acid & isophthalic acid (OH# = 118.7) | 216.9 |
| 2 | Trimethylol Propane | 9.8 |
| 3 | N-methylpyrrolidone | 119.2 |
| 4 | Di-cyclohexylmethane di-isocyanate | 257.4 |
| 5 | Dimethylolpropionic acid | 22.1 |
| 6 | Polyketone oligomer (from example D) | 169.4 |
| 7 | Triethylamine | 23.3 |

The resulting neutralized prepolymer was dispersed in water having an initial temperature of ~20-22° C. while maintaining the water/dispersion temperature below 28° C. The dispersed prepolymer was extended with 0.86 equivalents (versus NCO content) of hydrazine hydrate (35% hydrazine content). To the resulting dispersion (after no detectable NCO was observed via FTIR) 43.3 parts of adipic acid dihydrazide in 245.3 parts of warm (40-50° C.) water was added to give a 35.7% solids polyurethane dispersion with low sediment, a viscosity of 40 cps (at 25° C.) at a pH of 8.1. The dispersion containing ADH gave coatings that exhibited excellent fingernail mar resistance and black heel mark resistance after 1 day at room temperature versus coatings of the same polymer dispersion without any ADH.

Example E

Comparative Ketone Diol Synthesis

This is a comparative example of a ketone diol used to prepare a PUD from U.S. Pat. No. 4,983,662 Example 4. The diol was prepared form the following mixture as described in from U.S. Pat. No. 4,983,662 Example 4 (mixture heated for 7 hours at 85° C. in a nitrogen atmosphere). The resulting mixture was placed in a sealed container in a 70° C. oven to be used the next day to prepare the PUD in Example 8. The product as described in U.S. Pat. No. 4,983,662 Example 4 contains a ketone group pedant from the diol, as well as an amide group (from the diacetone acrylamide) and a tertiary amine (formed from reaction of diethanolamine with the unsaturated group on diacetoneacrylamide).

| Item # | Material | Parts |
|---|---|---|
| 1 | diethanolamine | 167.9 |
| 2 | Diacetone acrylamide | 104.2 |
| 3 | N-methylpyrrolidone | 167.9 |

Example 8

Comparative Self-Crosslinking PUD

A comparative self-crosslinking PUD was prepared using the diol from Example E using the procedure and composition described below. A prepolymer was prepared by combining items 1-4 of the ingredients below at 60° C. to a 4 neck flask equipped with a thermometer, overhead stirrer and gas inlet. The reaction below was run under a stream of dry nitrogen introduced through the gas inlet on the reactor. The temperature of the reaction mixture was raised to 85° C. to 88° C. and held at this temperature for 1 hour. Item 5 was then added and the temperature held at 85° C. to 88° C. for an additional 0.5 hour, item 6 was then added and held an additional 1 hour or until the theoretical NCO % was reached as indicated by titration of a small sample. When the prepolymer reached the theoretical NCO, the prepolymer temperature was dropped to 58-61° C. and item 7 was added and homogenized into the prepolymer to neutralize (ionize) the prepolymer.

| Item # | Material | Parts |
|---|---|---|
| 1 | Polyester from hexane diol, adipic acid & isophthalic acid (OH# = 34.6) | 140.3 |
| 2 | Ketone diol form Example E | 92.4 |
| 3 | N-methylpyrrolidone | 83 |
| 4 | Di-cyclohexylmethane di-isocyanate | 301.7 |
| 5 | Dimethylolpropionic acid | 25.6 |
| 6 | Dabco T-9 (Stannous Octoate) | 0.1 |
| 7 | Triethylamine | 10.8 |

The resulting neutralized prepolymer was dispersed in water containing 10.8 parts of triethylamine (split triethylamine between prepolymer and water as used in U.S. Pat. No. 4,983,662 Example 8) and having an initial temperature of ~20-22° C. while maintaining the water/dispersion temperature below 28° C. The dispersed prepolymer was extended with 0.92 equivalents (versus NCO content) of hydrazine hydrate (35% hydrazine content). The resulting dispersion has 37.7% solids, a viscosity of 110 cps (at 25° C.) at a PH of 8.1. For every 100 parts of the dispersion was 10.35 parts of a 15% adipic dihydrazide water solution to obtain a self-crosslinking system used for performance evaluation.

Example 9

Self-Crosslinking PUD

A self-crosslinking PUD was prepared using the diol from Example A and having a ketone content similar to that of Example 8 using the procedure and composition described below. A prepolymer was prepared by combining items 1-4 of the ingredients below at 60° C. to a 4 neck flask equipped with a thermometer, overhead stirrer and gas inlet. The reaction below was run under a stream of dry nitrogen introduced through the gas inlet on the reactor. The temperature of the reaction mixture was raised to 85° C. to 88° C. and held at this temperature for I hour. Item 5 was then added and the temperature held at 85° C. to 88° C. for an additional 0.5 hour, item 6 was then added and held an additional 1 hour or until the theoretical NCO % was reached as indicated by titration of a small sample. When the prepolymer reached the theoretical NCO, the prepolymer temperature was dropped to 58-61° C. and item 7 was added and homogenized into the prepolymer to neutralize (ionize) the prepolymer.

| Item # | Material | Parts |
|---|---|---|
| 1 | Polyester from hexane diol, adipic acid & isophthalic acid (OH# = 34.6) | 244.6 |
| 2 | Ketone diol form Example A | 122.6 |
| 3 | N-methylpyrrolidone | 164.8 |
| 4 | Di-cyclohexylmethane di-isocyanate | 262.2 |

-continued

| Item # | Material | Parts |
|---|---|---|
| 5 | Dimethylolpropionic acid | 30.1 |
| 6 | Dabco T-9 (Stannous Octoate) | 0.1 |
| 7 | Triethylamine | 25.4 |

The resulting neutralized prepolymer was dispersed in water having an initial temperature of ~20-22° C. while maintaining the water/dispersion temperature below 28° C. The dispersed prepolymer was extended with 0.92 equivalents (versus NCO content) of hydrazine hydrate (35% hydrazine content). The resulting dispersion has 36.2% solids, a viscosity of 40 cps (at 25° C.) at a pH of 7.9. For every 100 parts of the dispersion was 10.0 parts of a 15% adipic dihydrazide water solution to obtain a self-crosslinking system used for performance evaluation.

The polymer dispersions from Example 8 and 9 were formulated in a similar manner with added butyl carbitol (Dowanol DB) cosolvent to insure good film formation and with similar levels of ADH (0.8 ADH equivalents per ketone equivalent). The table below summarizes the results found. Despite the fact that Example 8 has an overall higher harder segment and greater amount of strongly associating hydrogen bonding groups including those from the amide in the diol, it did not perform as well as Example 9. Finger nail mar was tested on coatings drawn down 5 mil wet on black Laneta paper and allowed to cure for a given time then struck full force with a finger nail flick; rating was based on 10=Perfect and 0=Very Bad marring. Black heel marking was tested by coating maple boards with 3 coats allowing 2 hours dry time between coats and allowing the coatings to cure for a given time before striking the coatings with a hard rubber object with a controllable and consistent force; after trying to wipe any resulting marking with a dry cloth, a rating was given based on 10=no marking/scuffing, 0=severe marking and scuffing. Chemical resistance was tested by coating maple boards with 3 coats allowing 2 hours dry time between coats and allowing the coatings to cure for a given time before testing; test were done by saturating a cotton ball with the chemical to maintain it on the coating for I hour at RT before it is removed and a rating assessed based on 5=Excellent (no effect), 0=Total failure (complete removal of coating).

| Test | Example 8 (formulated) | Example 9 (formulated) |
|---|---|---|
| Finger Nail Mar 24 hrs cure | 8.00 | 9.00 |
| Finger Nail Mar 168 hrs cure | 8.00 | 10.00 |
| Black Heel Mark 24 hrs cure | 8.0 | 9.0 |
| Black Heel Mark 168 hrs cure | 8.0 | 10.0 |
| Tap Water Resistance | 3.0 | 5.0 |
| Windex | 4.0 | 5.0 |
| 409 | 3.0 | 5.0 |
| 50% Ethanol/Water | 4.0 | 4.0 |
| 70% IPA/Water | 4.0 | 4.0 |
| 1.4% NH4OH | 2.0 | 4.0 |
| Overall Total for Chemical Resistance | 20.0 | 27.0 |

Example 10

Poly-Ketone Oligomer Synthesis

A poly-ketone functional oligomer was prepared by combining items 1-3 of the ingredients below in a 4 neck flask equipped with a thermometer, overhead stirrer and nitrogen gas inlet. With stirring and under a nitrogen blanket, the temperature of the reaction mixture was raised to 11 0° C. to 114° C. and held at this temperature for 1 hour. The temperature was then raised to 121-125° C. and held at this temperature for four hours or until the acid number was <1.0 (mg/g). The final material was clear with an emerald green tint and a viscosity of ~3,800 cps at 70° C. at an acid number of 0.7 mg/g.

| Item # | Material | Parts by wt. |
|---|---|---|
| 1 | Epoxidized Linseed Oil (Plasthall ELO) | 270.0 |
| 2 | Levulinic Acid | 123.4 |
| 3 | Hycat 2000 (activated Cr3+ catalyst) | 1.9 |

Example 11

Polyurethane Dispersion Containing Poly-ketone Oligomer

A prepolymer was prepared by combining items 1-3 of the ingredients below at 60° C. to a 4 neck flask equipped with a thermometer, overhead stirrer and gas inlet. The reaction below was run under a stream of dry nitrogen introduced through the gas inlet on the reactor. The temperature of the reaction mixture was raised to 102° C. to 105° C. and held at this 120 minutes or until theoretical NCO was reached as indicated by titration of a small sample. Item 4 was then added and the temperature adjusted to at 72° C. to 75° C. where item 5 was then added. The temperature was then adjusted to 84-87° C. and held there for 1 hour or until the theoretical NCO % was reached as indicated by titration of a small sample. When the prepolymer reached the theoretical NCO, the prepolymer temperature was dropped to 57-60° C. and item 6 was added and homogenized into the prepolymer. Afterwards, item 8 was added and homogenized into the prepolymer at 57-C 60° C. to neutralize (ionize) the prepolymer which is then dispersed shortly afterwards.

| Item # | Material | Parts by wt. |
|---|---|---|
| 1 | Piothane 67-500 HNA (OH# = 223.2) | 107.3 |
| 2 | Trimethylol Propane | 2.5 |
| 3 | Di-cyclohexylmethane di-isocyanate | 176.9 |
| 4 | N-methylpyrrolidone | 87 |
| 5 | Dimethylolpropionic acid | 21.5 |
| 6 | Polyketone oligomer (from example 10) | 147.8 |
| 7 | Triethylamine | 20.2 |

The resulting neutralized prepolymer was dispersed in water having an initial temperature of ~20-22° C. while maintaining the water/dispersion temperature below 28° C. The dispersed prepolymer was extended with 16.1 parts hydrazine hydrate (35% hydrazine content) and 10 minutes afterwards with 5.6 parts of a 25% aqueous solution of ethylenediamine. The resulting polyurethane dispersion was low in sediment with a solids level of 37.6%, a viscosity of 110 cps (at 25° C.) at a pH of 7.8 with a particle size of 44.8 nm.

To 100 g of the resulting dispersion (after no detectable NCO was observed via FTIR) 1.73 parts of adipic acid dihydrazide in 9.8 parts of warm (40-50° C.) water was added. Coatings of the dispersion containing the above concentration of ADH display excellent film formation, mar resistance, black heel mark resistance and alcohol resistance after as little as 24 hrs after application at room temperature (˜24° C.).

Example 12

Polyurethane-Acrylic Dispersion Containing Poly-ketone Oligomer

This example demonstrates how an NMP/co-solvent free urethane-acrylic hybrid could be prepared using similar raw materials that are employed in Example 11. A prepolymer was prepared by combining items 1-7 of the ingredients below at 60° C. to a 4 neck flask equipped with a thermometer, overhead stirrer and gas inlet. The reaction below was run under a stream of dry air introduced through the gas inlet on the reactor. The temperature of the reaction mixture was raised to 86° C. to 89° C. and held at this temperature for 150 minutes or until the theoretical NCO % was reached as indicated by titration of a small sample. When the prepolymer reached the theoretical NCO, the prepolymer temperature was dropped to 57-60° C. and item 8 was added and homogenized into the prepolymer. Afterwards, item 9 was added and homogenized into the prepolymer at 57-60° C. to neutralize (ionize) the prepolymer which is then dispersed shortly afterwards.

| Item # | Material | Parts by wt. |
|---|---|---|
| 1 | Piothane 1000 HAI (OH# = 37.0) | 186.7 |
| 2 | Trimethylol Propane | 4.2 |
| 3 | Dimethylolpropionic acid | 35.5 |
| 4 | Methyl methacrylate | 197.2 |
| 5 | Butyl acrylate | 49.4 |
| 6 | BHT | 0.1 |
| 7 | Di-cyclohexylmethane di-isocyanate | 266.4 |
| 8 | Polyketone oligomer (from Example 10) | 246.6 |
| 9 | Triethylamine | 28.9 |

A polyurethane dispersion was prepared by dispersing the neutralized prepolymer in water while maintaining the water/dispersion temperature below 28° C. The dispersed prepolymer was extended with 34.5g of hydrazine hydrate (35% hydrazine content) and 10 minutes afterwards with 12.1 parts of a 25% aqueous solution of ethylenediamine. After allowing about 45 minutes for chain extension the temperature of the dispersion was adjusted to 33-35° C. and 0.3 parts of a 1% solution Fe-EDTA complex and 11.3 parts of aqueous 3.5% tert-butyl hydrogen peroxide is added followed by a slow addition of 19.7 parts of 2.0% aqueous erythorbic acid neutralized with triethylamine. An exotherm resulted (~8-11° C.) indicating initiation and polymerization of the acrylic monomer present. This resulted in a 42.2% solids polyurethane dispersion with low sediment, a viscosity of 220 cps (at 25° C.) at a pH of 7.8 with a particle size of 54.6 nm.

To 100 parts of the above dispersion 1.88 parts of adipic dihydrazide (ADH) was added to allow self-crosslinking between carbonyl/ketone groups in the poly-ketone oligomer. This provided a coating which cured rapidly at room temperature to provide excellent mar, black heel mark and alcohol resistance in a 24 hr dry/cure time versus the same coating without ADH which has poor to fair mar, black heel mark and alcohol resistance in the same cure time. Interestingly, despite the high hardness of the urethane-acrylic composition (Koenig (osc.)=77 after 24 hours), it forms good films at room temperature without added coalescent and has a measured MFFT of 17° C.

Example 13

Poly-Ketone Oligomer Synthesis

A poly-ketone functional oligomer was prepared by combining items 1-3 of the ingredients below in a 4 neck flask equipped with a thermometer, overhead stirrer and nitrogen gas inlet. With stirring and under a nitrogen blanket, the temperature of the reaction mixture was raised to 110° C. to 114° C. and held at this temperature for 1 hour. The temperature was then raised to 121-125° C. and held at this temperature for four hours or until the acid number was <1.0 (mg/g). The final material was clear with an emerald green tint and a viscosity of ~1,800 cps at 70 ° C. at an acid number of 0.98mg/g.

| Item # | Material | Parts by wt. |
|---|---|---|
| 1 | Epoxidized Soybean Oil (Jenkinol 680) | 300.8 |
| 2 | Levulinic Acid | 96.5 |
| 3 | Hycat 2000 (activated Cr3+ catalyst) | 2.0 |

Example 14

Polyurethane-Acrylic Dispersion Containing Poly-ketone Oligomer

This example demonstrates how an NMP/co-solvent free urethane-acrylic hybrid could be prepared incorporating the poly-ketone oligomer described in Example 13. A prepolymer was prepared by combining items 1-7 of the ingredients below at 60° C. to a 4 neck flask equipped with a thermometer, overhead stirrer and gas inlet. The reaction below was run under a stream of dry air introduced through the gas inlet on the reactor. The temperature of the reaction mixture was raised to 86° C. to 89° C. and held at this temperature for 150 minutes or until the theoretical NCO % was reached as indicated by titration of a small sample. When the prepolymer reached the theoretical NCO, the prepolymer temperature was dropped to 57-60° C. and item 8 was added and homogenized into the prepolymer. Afterwards, item 9 was added and homogenized into the prepolymer at 57-60° C. to neutralize (ionize) the prepolymer which is then dispersed shortly afterwards.

| Item # | Material | Parts by wt. |
|---|---|---|
| 1 | Piothane 1000 HAI (OH# = 37.0) | 91.9 |
| 2 | Trimethylol Propane | 2.1 |
| 3 | Dimethylol butanoic acid | 23.3 |
| 4 | Methyl methacrylate | 76.4 |
| 5 | Butyl acrylate | 19.1 |
| 6 | BHT | 0.1 |
| 7 | Di-cyclohexylmethane di-isocyanate | 145.1 |
| 8 | Polyketone oligomer (from example 13) | 119.3 |
| 9 | Triethylamine | 17.1 |

A polyurethane dispersion was prepared by dispersing the neutralized prepolymer in water while maintaining the water/dispersion temperature below 28° C. The dispersed prepolymer was extended with 1 7.9g of hydrazine hydrate (35% hydrazine content) and 10 minutes afterwards with 8.2 parts of a 25% aqueous solution of ethylenediamine. After allowing about 45 minutes for chain extension the temperature of the dispersion was adjusted to 33-35° C. and 0.2 parts of a 1% solution Fe-EDTA complex and 5.6 parts of aqueous 3.5% tert-butyl hydrogen peroxide is added followed by a slow addition of 9.8 parts of 2.0% aqueous erythorbic acid neutralized with triethylamine. An exotherm resulted (~8-11° C.) indicating initiation and polymerization of the acrylic monomer present. This resulted in a 43.3% solids polyurethane dispersion with low sediment, a viscosity of 96 cps (at 25° C.) at a pH of 7.5 with a particle size of 53.3 nm.

To 100 parts of the above dispersion 1.54 parts of adipic dihydrazide (ADH) was added to allow self-crosslinking between carbonyl/ketone groups in the poly-ketone oligomer. This provided a coatings which cured rapidly at room temperature to provide very good mar, black heel mark and alcohol resistance in a 24 hr dry/cure time

Example 15

Poly-Ketone Oligomer Synthesis

A ketone functional oligomer was prepared by combining items 1-3 of the ingredients below in a 4 neck flask equipped with a thermometer, overhead stirrer and nitrogen gas inlet. With stirring and under a nitrogen blanket, the temperature of the reaction mixture was raised to 100° C. to 103° C. and held at this temperature for 1 hour. The temperature was then raised to 110-114° C. and held there for an additional hour. Finally the reaction mixture was raised to 121-125° C. and held at this temperature for three hours or until the acid number was <1.0 (mg/g). The final material had a slight amber color and a viscosity of ~2300 cps at 70° C.

| Item # | Material | Parts by wt. |
|---|---|---|
| 1 | Sorbitol polyglycidyl ether (Erisys GE-60) | 243.0 |
| 2 | Levulinic Acid | 151.3 |
| 3 | Triphenyl phosphine (TPP) | 2.5 |

Example 16

Polyurethane Dispersion Containing Poly-ketone Oligomer

A prepolymer was prepared by combining items 1-3 of the ingredients below at 60° C. to a 4 neck flask equipped with a thermometer, overhead stirrer and gas inlet. The reaction below was run under a stream of dry nitrogen introduced through the gas inlet on the reactor. The temperature of the reaction mixture was raised to 102° C. to 105° C. and held at this 120 minutes or until theoretical NCO was reached as indicated by titration of a small sample. Item 4 was then added and the temperature adjusted to at 72° C. to 75° C. where item 5 was then added. The temperature was then adjusted to 84-87° C. and held there for 1 hour or until the theoretical NCO % was reached as indicated by titration of a small sample. When the prepolymer reached the theoretical NCO, the prepolymer temperature was dropped to 57-60° C. and item 6 was added and homogenized into the prepolymer. Afterwards, item 8 was added and homogenized into the prepolymer at 57-60° C. to neutralize (ionize) the prepolymer which is then dispersed shortly afterwards.

| Item # | Material | Parts by wt. |
|---|---|---|
| 1 | Piothane 67-500 HNA (OH# = 223.2) | 107.3 |
| 2 | Trimethylol Propane | 2.5 |
| 3 | Di-cyclohexylmethane di-isocyanate | 176.9 |
| 4 | N-methylpyrrolidone (NMP) | 87 |
| 5 | Dimethylolpropionic acid | 21.5 |
| 6 | Polyketone oligomer (from example 15) | 147.8 |
| 7 | Triethylamine | 20.2 |

The resulting neutralized prepolymer was dispersed in water having an initial temperature of ~20-22° C. while maintaining the water/dispersion temperature below 28° C. The dispersed prepolymer was extended with 16.2 parts hydrazine hydrate (35% hydrazine content) and 10 minutes afterwards with 5.7 parts of a 25% aqueous solution of ethylenediamine. This resulted in a 39.2% solids polyurethane dispersion with low sediment having a viscosity of 70 cps (at 25° C.) at a pH of 7.5° C.).

Although only a few embodiments of this invention have been described above, it should be appreciated that many modifications can be made without departing from the spirit and scope of the invention. All such modifications can be included within the scope of the invention, which is to be limited only by the following claims. Patents cited for their teachings and enablements are hereby incorporated by reference.

The invention claimed is:

1. An aqueous dispersion of polyurethane comprising:
   a) a urethane polymer or prepolymer,
   b) a ketone functional molecule having a number average molecular weight of less than 2000 Daltons having at least one ketone functional moiety and wherein ketone functional molecule is characterized by a separation of at least 7 intervening atoms between the reactive carbonyl group of said ketone functional molecule and any basic nitrogen atoms,
   c) at least one molecule of number average molecular of less than 2000 Daltons having at least one hydrazine moiety co-reactive with said ketone function moiety, and
   d) water.

2. The dispersion of claim 1, wherein the ketone functional molecule includes at least one poly-ketone functional moiety.

3. The dispersion of claim 2, wherein the ketone functional molecule has a number average molecular weight between 150 and 2000 Daltons and on average at least two ketone moiety per molecule.

4. The dispersion of claim 2, wherein the urethane polymer or prepolymer contains sufficient water dispersibility-enhancing compound so that the polyurethane polymer or prepolymer will form a stable dispersion in water in the substantial absence of surfactant.

5. Te dispersion of claim 1, wherein the molecule with at least one hydrazine moiety comprises a component with at least two hydrazine moieties.

6. The dispersion of claim 2, wherein said urethane polymer comprises ketone functional moiety(s).

7. The dispersion of claim 2, wherein said ketone functional molecule comprises a polyester oligorner.

8. The dispersion of claim 2, wherein said ketone functional molecule comprises an oligomer with at least one urethane linkage.

9. The dispersion of claim 2, wherein said ketone functional molecule is prepared by reacting levulinic acid with a diglcidylether of bisphenol A and then coupling the resulting reaction product with a diisocyanate.

10. The dispersion of claim 2 wherein said ketone functional molecule also contains a secondary self-crosslinking functionality such as an auto-oxidative unsaturated fatty acid group (derived from oils such as linseed, soybean, tung, tall, sunflower, safflower etc.).

11. The dispersion of claim 5, werein said ketone functional molecule comprises at least two ketone moieties.

12. A process for making an aqueous dispersion of urethane prepolymer or polymer, comprising the steps of:
  a) forming a urethane prepolymer or polymer of at least 2000 Daltons number average molecular weight from one or more polyol reactants and one or more isocyanate reactants,
  b) adding a ketone functional molecule having a number average molecular weight of less than 2000 Daltons to said urethane prepolymer or polymer and wherein ketone functional molecule is characterized by a separation of at least 7 intervening atoms between the reactive carbonyl group of said ketone functional molecule and any basic nitrogen atoms,
  c) dispersing at least the urethane prepolymer or polymer in an aqueous phase as discrete particles, and
  d) adding a molecule having at least one hydrazine moiety to the other components containing a urethane polymer or prepolymer, and/or a -ketone functional molecule to form azomethine linkages between the ketone functional molecule and said molecule having at least one hydrazine moiety.

13. The process of claim 12, wherein said prepolyrner or polymer is formed by bulk polymerization or solution polymerization.

14. The process of claim 12 wherein said urethane prepolymer is present and is chain extended in the aqueous medium.

15. The process of claim 14, wherein the polyketone functional molecule is added to the prepolymer prior to dispersing into aqueous media.

16. The process of claim 12, wherein the urethane prepolymer or polymer contains sufficient water dispersibility-enhancing compound so that the urethane prepolymer or polymer will form a stable dispersion in the aqueous medium in the substantial absence of free surfactant.

17. The process of claim 16, wherein the water dispersibility-enhancing compound includes carboxyl groups, the process further comprising neutralizing the carboxyl groups.

18. An aqueous dispersion of polyurethane comprising:
  a) a urethane polymer or prepolymer,
  b) a ketone functional molecule derived from reacting a C3-C20 ketone or aldehyde containing carboxylic acid with 1) an epoxidized triglyceride or 2) an epoxidized polyester, said ketone functional molecule being characterized by having a number average molecular weight from about 500 to about 50,000 Daltons and having at least one ketone or aldehyde functional moiety,
  c) at least one molecule having at least one hydrazine moiety co-reactive with said ketone functional molecule, and
  d) water.

19. The dispersion of claim 18, wherein said ketone functional molecule comprises the reaction product of levulinic or pyruvic acid with 1) an epoxidized vegetable oil or 2) a polyester that has been oxidatively epoxidized from an unsaturated aliphatic polyester.

20. The dispersion of claim 19, wherein the ketone functional molecule comprises the reaction product of a C3-C20 ketone carboxylic acid with an epoxidized linseed or soybean oil.

21. The dispersion of claim 18, wherein said ketone functional molecule has a number average molecular weight between about 500 and 10,000 and said dispersion optionally includes acrylic monomers and/or acrylic polymer.

22. An aqueous dispersion of polyurethane comprising:
  a) a urethane polymer or prepolymer,
  b) a ketone functional molecule derived from reacting a C3-C20 ketone or aldehyde containing carboxylic acid with the di or poly hydroxyl or di or poly epoxy functionalized 1) linear, branched, or cyclic aliphatic or aromatic alcohol; 2) a self condensation reaction product for one or more C2-C20 linear, branched, or cyclic aliphatic or aromatic alcohol; 3) an C2-C4 alkoxylate extended C2-C20 linear, branched, or cyclic aliphatic or aromatic alcohol; and/or 4) an C2-C4 alkoxylate extended a self condensation reaction product for one or more C2-C20 linear, branched, or cyclic aliphatic or aromatic alcohol; said ketone functional molecule being characterized by having a number average molecular weight from about 150 to about 50,000 Daltons and having at least one ketone or aldehyde functional moiety, wherein aliphatic or aromatic alcohol is defined to include aliphatic substituted aromatic alcohols and aromatic substituted aliphatic alcohols,
  c) at least one molecule having at least one hydrazine moiety co-reactive with said ketone functional moiety, and
  d) water.

23. An aqueous dispersion according to claim, 22, wherein said ketone functional molecule has an average of from 2.5 to 6 ketone groups per molecule and said dispersion optionally includes acrylic monomers and/or acrylic polymer.

24. An aqueous dispersion according to claim 22, wherein the ketone functional molecule is modified by a monoisocyanate or coupled with a di or polycarboxylic acid.

25. An aqueous dispersion according to claim 24, wherein said ketone functional molecule is characterized by at least one ketone group laterally attached to the molecule and having a separation of at least 7 intervening atoms between said ketone group and the nearest basic nitrogen atom.

* * * * *